(12) United States Patent
Hatasawa

(10) Patent No.: US 8,305,489 B2
(45) Date of Patent: Nov. 6, 2012

(54) VIDEO CONVERSION APPARATUS AND METHOD, AND PROGRAM

(75) Inventor: Yasunari Hatasawa, Tokyo (JP)

(73) Assignee: Sony Corporation, Tokyo (JP)

( * ) Notice: Subject to any disclaimer, the term of this patent is extended or adjusted under 35 U.S.C. 154(b) by 487 days.

(21) Appl. No.: 12/576,627

(22) Filed: Oct. 9, 2009

(65) Prior Publication Data

US 2010/0091183 A1    Apr. 15, 2010

(30) Foreign Application Priority Data

Oct. 10, 2008 (JP) ................. P2008-263513

(51) Int. Cl.
*H04N 7/01* (2006.01)
*H04N 11/20* (2006.01)

(52) U.S. Cl. .......... 348/450; 348/448; 348/458

(58) Field of Classification Search ........... 348/444, 348/450, 453, 448, 631, 713
See application file for complete search history.

(56) References Cited

U.S. PATENT DOCUMENTS 5,373,322 A * 12/1994 Laroche et al. ............... 348/273
2005/0259748 A1* 11/2005 Payson et al. ............ 375/240.25

FOREIGN PATENT DOCUMENTS

JP          8-33002          2/1996

* cited by examiner

*Primary Examiner* — Michael Lee
(74) *Attorney, Agent, or Firm* — Finnegan, Henderson, Farabow, Garrett & Dunner, L.L.P.

(57) ABSTRACT

A video conversion apparatus includes: a video format conversion unit configured to interpolate, in the case that video signals, which are made up of a luminance component and color difference components and of which the video format is the interlace format, have been supplied, the luminance component and color difference components of the video signals, thereby converting the video format of the video signals into the progressive format; and a color difference format conversion unit configured to interpolate the color difference components of the video signals obtained with the conversion by the video format conversion unit, thereby converting the color difference format of the video signals from a first color difference format to a second color difference format that includes more color difference components than the first color difference format.

8 Claims, 23 Drawing Sheets

NUMBER OF TIMES OF
LUMINANCE QUIESCENCE

NUMBER OF TIMES OF COLOR
DIFFERENCE QUIESCENCE

○ LUMINANCE SIGNAL
◌ SIMILAR DIRECTION
◇ COLOR DIFFERENCE SIGNAL

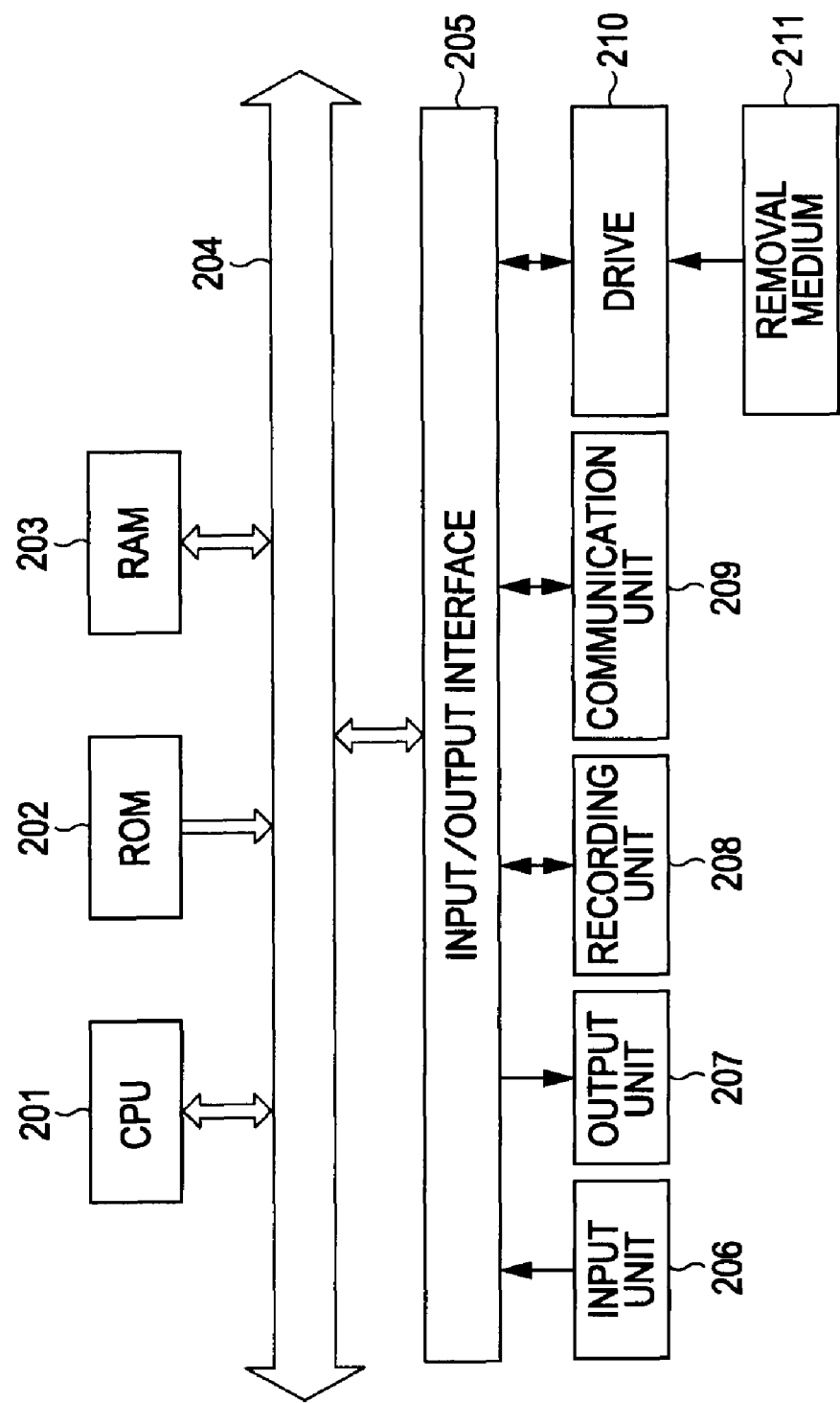

VIDEO CONVERSION APPARATUS AND METHOD, AND PROGRAM

BACKGROUND OF THE INVENTION

1. Field of the Invention

The present invention relates to a video conversion apparatus and method, and a program, and specifically, a video conversion apparatus and method, and a program whereby deterioration in image quality can be suppressed in the case of converting the video format and color difference format of video signals.

2. Description of the Related Art

For example, in the case that video signals used for displaying a digital image are recorded in a recording medium, the video signals are converted into video signals of which the color difference format is 4:2:0 and the video format is the interlace format due to a reason such as increase in the compression ratio of data, or the like, and are then recorded in some cases. The video signals of which the color difference format is 4:2:0 is made up of luminance components and color difference components, and are signals wherein the resolution (information quantity) of the color difference components is a half of the resolution of the luminance components in the horizontal direction and in the vertical direction of the image based on the video signals.

In the case that such video signals are read out from a recording medium, and are displayed on a digital television receiver or the like, the color difference format of the readout video signals is converted from 4:2:0 to 4:2:2 through a filter process. Subsequently, the video format of the video signals is converted from the interlace format to the progressive format.

The video signals thus obtained in the progressive format of which the color difference format is 4:2:2 is subjected to a predetermined process such as an improvement in image quality, or the like as appropriate. The video signals subjected to the process are further converted into signals made up of each component of R, G, and B of which the color difference format is 4:4:4, and an image is displayed based on the video signals obtained by the conversion.

Also, with the related art, a technique has been proposed wherein, in the case that the color difference format of video signals is converted, whether or not the video format of the video signals is the interlace format is detected, and a filter to be used is dynamically switched according to the detection result thereof (e.g., see Japanese Unexamined Patent Application Publication No. 8-33002).

SUMMARY OF THE INVENTION

However, with the above technique, in the case that video signals in the progressive format of which the color difference format is 4:2:2 are obtained from video signals of which the color difference format is 4:2:0 and the video format is the interlace format, the image quality of the image based on the video signals is deteriorated.

That is to say, in the case that the color difference format of the video signals in the interlace format is converted from 4:2:0 to 4:2:2, a pixel positioned spatially near a pixel to be interpolated is used to execute an interpolation process. Therefore, it has been recognized that the interpolation process of color difference components having a little information quantity can be executed with poor precision, and consequently, the image quality of the image of the video signals in the interlace format of which the color difference format is 4:2:2 obtained by the conversion is deteriorated.

In the case that the color difference format of video signals is converted, even if a filter is changed dynamically using the above technique, the interpolation process using a pixel spatially near a pixel to be interpolated is executed, and accordingly, deterioration in image quality may be insufficiently suppressed.

Also, in the case that the video format of video signals is converted from the interlace format to the progressive format as well, with regard to each component of a pixel to be interpolated, a pixel spatially near that pixel is used to execute the interpolation process. However, the color difference of the video signals of which the color difference format has been set to 4:2:2 has already been deteriorated, and accordingly, blurring, flickering, so-called "jaggies", or the like, occurs on the image of the video signals thereof due to conversion of the video format, and the image quality thereof is further deteriorated.

An arrangement for converting the video format of video can also be conceived wherein temporal change in a pixel of the image is detected, and based on the detection result thereof, a pixel spatially or temporally in the vicinity of that pixel on the image is used to execute the interpolation process. However, in this case as well, the video signals of which the color difference format has been set to 4:2:2 have already deteriorated, and accordingly, comb-like noise called "chroma upsampling error" occurs on a border portion of a deep-colored region on the image, and the image quality thereof is deteriorated.

As described above, upon the color difference components of video signals being subjected to a nonlinear process to obtain video signals having the progressive format of which the color difference format is 4:2:2, the image quality of the image of the video signals is deteriorated, and accordingly, it has been difficult to subject the video signals to a process to increase the image quality of the image at the subsequent stage.

It has been found to be desirable to enable suppression of deterioration in the image quality of the image based on the video signals when the color difference format and video format of video signals are converted.

According to an embodiment of the present invention, a video conversion apparatus includes: a video format conversion unit configured to interpolate, in the case that video signals, which are made up of a luminance component and color difference components and of which the video format is the interlace format, have been supplied, the luminance component and color difference components of the video signals, thereby converting the video format of the video signals into the progressive format; and a color difference format conversion unit configured to interpolate the color difference components of the video signals obtained with the conversion by the video format conversion unit, thereby converting the color difference format of the video signals from a first color difference format to a second color difference format that includes more color difference components than the first color difference format.

The color difference format conversion unit may include: a similar direction determining unit configured to use the luminance component of a pixel of an image based on the video signals to obtain a similar direction where similar pixels are arrayed mutually near a predetermined pixel; and a color difference phase interpolation unit configured to use a pixel specified with the similar direction to interpolate the color difference components of a pixel near the predetermined pixel.

The video format conversion unit may include: a luminance quiescence detecting unit configured to use the video signals made up of consecutive several fields to detect whether or not there is change in the luminance component of a pixel on the image based on the video signals; a luminance interpolation unit configured to use a pixel positioned temporally or spatially near a first pixel of interest within the image of a field to be processed to interpolate the luminance component of the first pixel of interest based on the detection result of the luminance quiescence detecting unit; a color difference quiescence detecting unit configured to use the video signals made up of consecutive several fields to detect whether or not there is change in the luminance component of a pixel on the image based on the video signals; and a color difference interpolation unit configured to use a pixel positioned temporally or spatially near a second pixel of interest within the image of the field to be processed to interpolate the luminance component of the second pixel of interest based on the detection result of the color difference quiescence detecting unit.

The color difference quiescence detecting unit may use the detection result by the luminance quiescence detecting unit to detect whether or not there is change in color difference components.

According to an embodiment of the present invention, there are provided a video conversion method and a program including the steps of: interpolating, in the case that video signals, which are made up of a luminance component and color difference components and of which the video format is the interlace format, have been supplied, the luminance component and color difference components of the video signals, thereby converting the video format of the video signals into the progressive format, and interpolating the color difference components of the video signals obtained with the conversion of the video format, thereby converting the color difference format of the video signals from a first color difference format to a second color difference format that includes more color difference components than the first color difference format.

In the case that video signals, which are made up of a luminance component and color difference components and of which the video format is the interlace format, have been supplied, the luminance component and color difference components of the video signals may be interpolated, thereby converting the video format of the video signals into the progressive format, and the color difference components of the video signals obtained with the conversion of the video format may be interpolated, thereby converting the color difference format of the video signals from a first color difference format to a second color difference format that includes more color difference components than the first color difference format.

According to the above configurations, the color difference format and video format of video signals can be converted. Specifically, according to an embodiment of the present invention, in the case that the color difference format and video format of video signals are converted, deterioration in the image quality of the image based on the video signals can be suppressed.

BRIEF DESCRIPTION OF THE DRAWINGS

FIG. 27 is a diagram illustrating a configuration example of a computer.

DESCRIPTION OF THE PREFERRED EMBODIMENTS

An embodiment to which the present invention has been applied will be described below with reference to the drawings.

Configuration of Video Conversion Apparatus

Figure 1:
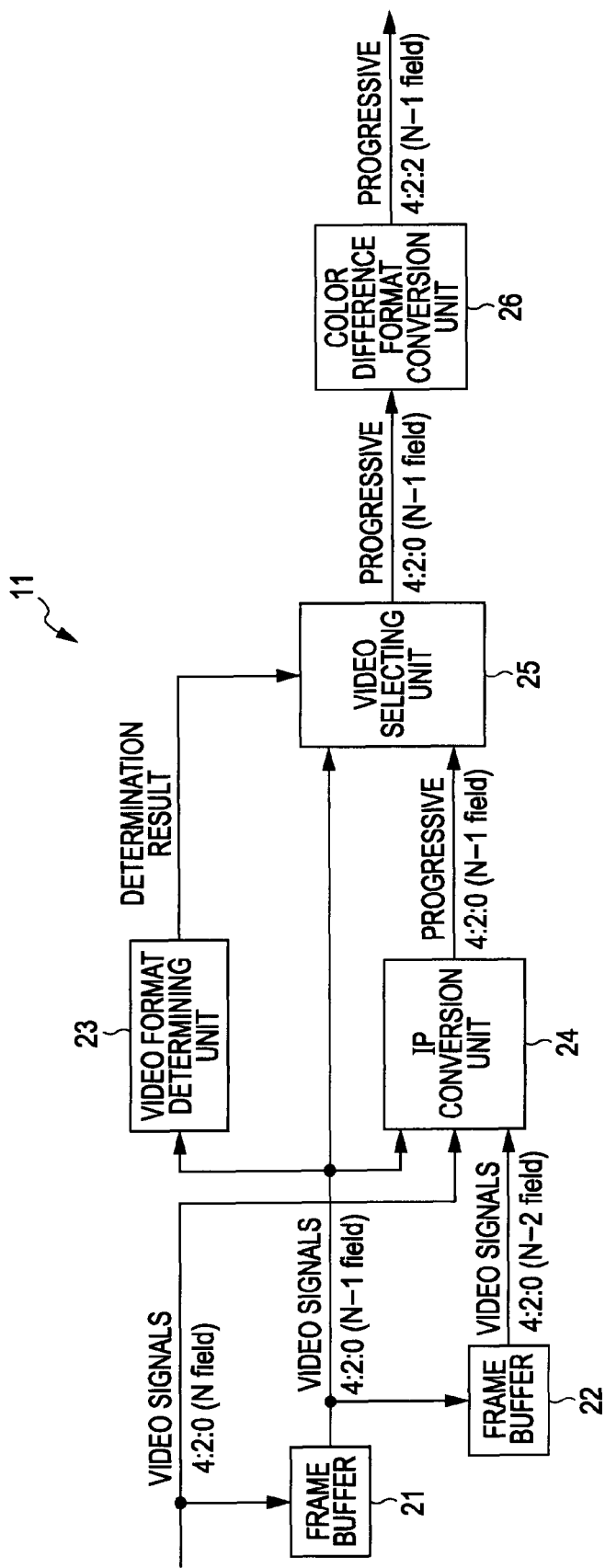
FIG. 1 is a diagram illustrating a configuration example of a video conversion apparatus to which an embodiment of the present invention has been applied.

FIG. 1 is a block diagram illustrating a configuration example of a video conversion apparatus 11 to which an embodiment of the present invention has been applied. Video signals made up of a luminance signal (Y component) and color difference signals (Cr component and Cb component) of which the color difference format is 4:2:0 are supplied to the video conversion apparatus 11. The video signals are, for example, signals encoded (digitally compressed) with a method, for example, such as the MPEG (Moving Picture Experts Group) or the like, used for displaying a moving image, and the video format of the video signals is either the progressive format or the interlace format.

The video conversion apparatus 11 converts the supplied video signals into video signals of which the color difference format is 4:2:2 and the video format is the progressive format, and outputs the converted video signals. The video conversion apparatus 11 is configured of frame buffers 21 and 22, a video format determining unit 23, an IP (Interlace/Progressive) conversion unit 24, a video selecting unit 25, and a color difference format conversion unit 26.

Also, with the video conversion apparatus 11, one field (frame) worth of the video signals is supplied to the frame buffer 21 and the IP conversion unit 24 at a time. Specifically, in the case that the video format of the video signals is the interlace format, one field worth of the video signals is supplied at a time, and in the case of the progressive format, one frame worth of the video signals is supplied at a time.

Note that, hereinafter, in order to simplify explanation, one field worth of the video signals will be referred regardless of the video format thereof. That is to say, in the case that the video format is the progressive format, we will say that one field worth of the video signals means one frame worth of the video signals.

The frame buffer 21 stores the supplied video signals only for one field worth of time, and then supplies these to the frame buffer 22, video format determining unit 23, IP conversion unit 24, and video selecting unit 25. That is to say, the frame buffer 21 delays the supplied video signals only for one field worth of time.

The frame buffer 22 stores the video signals supplied from the frame buffer 21 only for one field worth of time, and then supplies these to the IP conversion unit 24. Note that the video signals supplied to the frame buffer 21, the video signals output from the frame buffer 21, and the video signals output from the frame buffer 22 will also be referred to as the video signals of a field N through a field (N−2), respectively. That is to say, the field (N−1) and field (N−2) are a field one step back, and a field two steps back as to the field N, respectively.

The video format determining unit 23 determines, based on the video signals supplied from the frame buffer 21, whether or not the video format of the video signals thereof is the interlace format, and supplies the determination result thereof to the video selecting unit 25.

The IP conversion unit 24 uses the supplied video signals of the field N, the video signals of the field (N−1) from the frame buffer 21, and the video signals of the field (N−2) from the frame buffer 22 to execute an IP conversion process, thereby converting the video format of the video signals. That is to say, according to the IP conversion process, the video signals of the field (N−1) are taken as a processing target, the video format of the video signals thereof is converted from the interlace format to the progressive format, and the video signals obtained by the conversion are supplied to the video selecting unit 25. Now, let us say that the color difference format (video format) of the video signals obtained by the IP conversion process is still 4:2:0.

The video selecting unit 25 selects, based on the determination result from the video format determining unit 23, either the video signals from the frame buffer 21 or the video signals from the IP conversion unit 24, and supplies the selected video signals to the color difference format conversion unit 26.

Specifically, with the video selecting unit 25, in the case that the video format of the video signals from the frame buffer 21 is the progressive format, the video signals thereof are selected, and in the case that the video format of the video signals from the frame buffer 21 is the interlace format, the video signals from the IP conversion unit 24 are selected. Even in either case, the video signals of the field (N−1) of which the video format is the progressive format are supplied from the video selecting unit 25 to the color difference format conversion unit 26.

The color difference format conversion unit 26 executes a color difference format conversion process wherein the color difference format of the video signals supplied from the video selecting unit 25 is converted from 4:2:0 to 4:2:2, and outputs the video signals thus obtained. Therefore, consequently, the video signals of the field (N−1) of which the color difference format is 4:2:2 and the video format is the progressive format are output from the color difference format conversion unit 26. The video signals output from the color difference format conversion unit 26 are subjected to a process such as an improvement in image quality or the like at the subsequent stage, or a process used for converting into video signals including components of R, G, and B of which the color difference format is 4:4:4.

Thus, with the video conversion apparatus 11, upon the video signals of the field N being supplied, the video signals of the field (N−1) are output. That is to say, with the video conversion apparatus 11, fields temporally before and after the field to be processed are used, thereby converting the video format and color difference format of the video signals, and accordingly, one field (frame) worth of processing delay occurs with the whole of the video conversion apparatus 11.

Incidentally, description has been made so far wherein the video signals of which the color difference format is 4:2:0 and the video format is the interlace format or progressive format are supplied to the video conversion apparatus 11.

Figure 2:
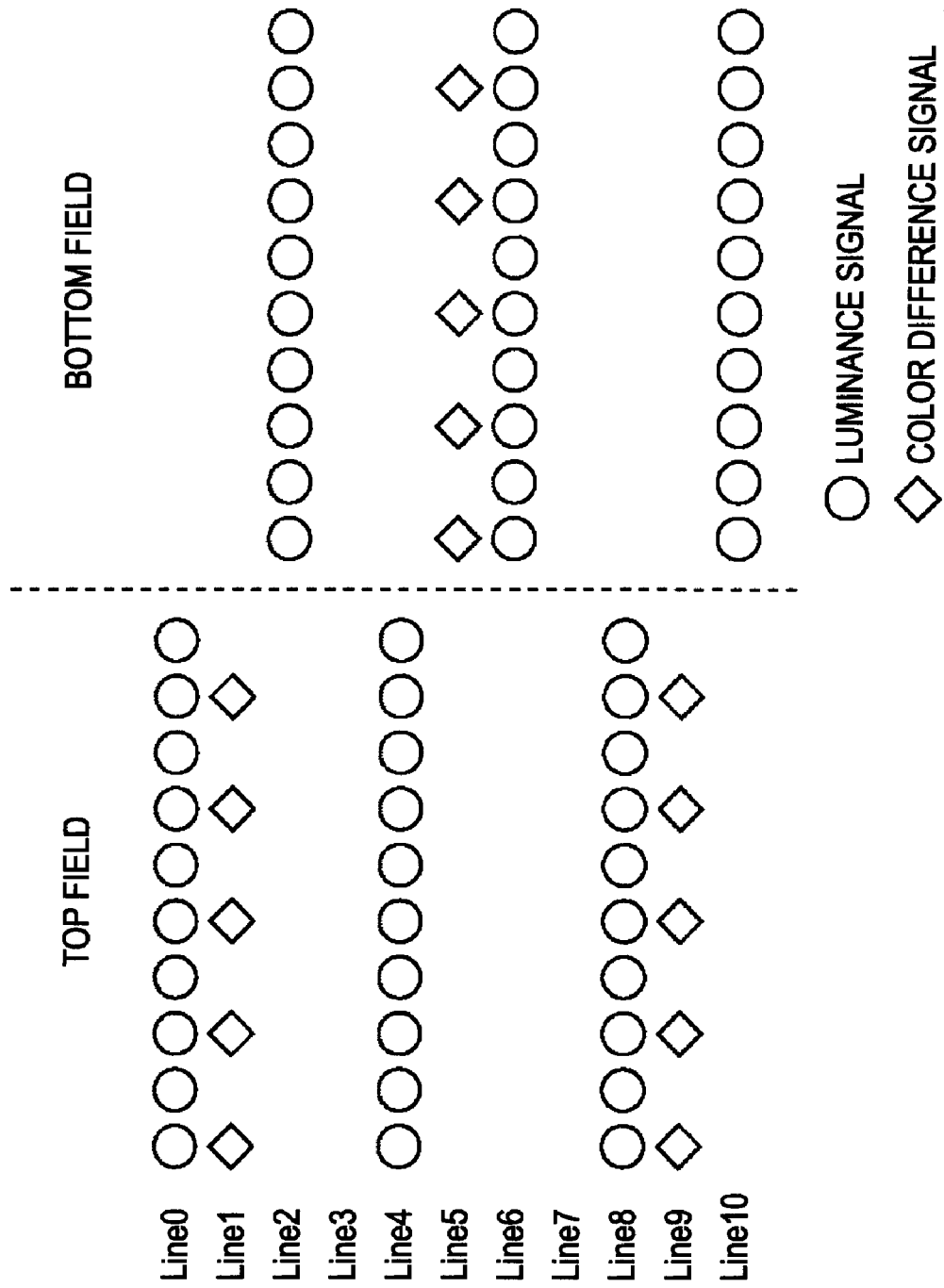
FIG. 2 is a diagram describing an image having the interlace format.

In the case that the video signals have the interlace format, for example, as shown in FIG. 2, the video signals made up of an image signal called a top field, and an image signal called a bottom field, are supplied to the video conversion apparatus 11.

Note that, in FIG. 2, the left side illustrates the image of the top field, and the right side illustrates the image of the bottom field. Also, with the image of each field, a single circle and a single square represent a single pixel having a luminance component (Y component) and a single pixel having color difference components (Cr component and Cb component), of the video signals, respectively. Further, the words "Line 0" through "Line 10" are used for representing lines in the horizontal direction in FIG. 2 with the image of each field, and are actually not included in the images.

In FIG. 2, if we say that the horizontal direction is referred to as the x direction, and the vertical direction is referred to as the y direction, the image of each field is made up of 10 lines each made up of pixels arrayed in the x direction being arrayed in the y direction. Also, with the image of each field, all the pixels making up a certain line have a luminance component, and of lines adjacent to the line having luminance components in the y direction, several pixels making up a certain line have color difference components. With a line having color difference components, pixels having color difference components are disposed in the x direction with one pixel interval.

Further, with the image of the top field, and the image of the bottom field, pixels of the other field positioned in the same positions as pixels having a luminance component or color difference components in the image of one field, i.e., the pixels of the same phase have neither a luminance component nor color difference components.

Such video signals in the interlace format are signals wherein the signals of the top field and the signals of the bottom field are disposed alternately. That is to say, in the case that the image based on the video signals is displayed, the image of the top field, and the image of the bottom field are displayed alternately.

Figure 3:
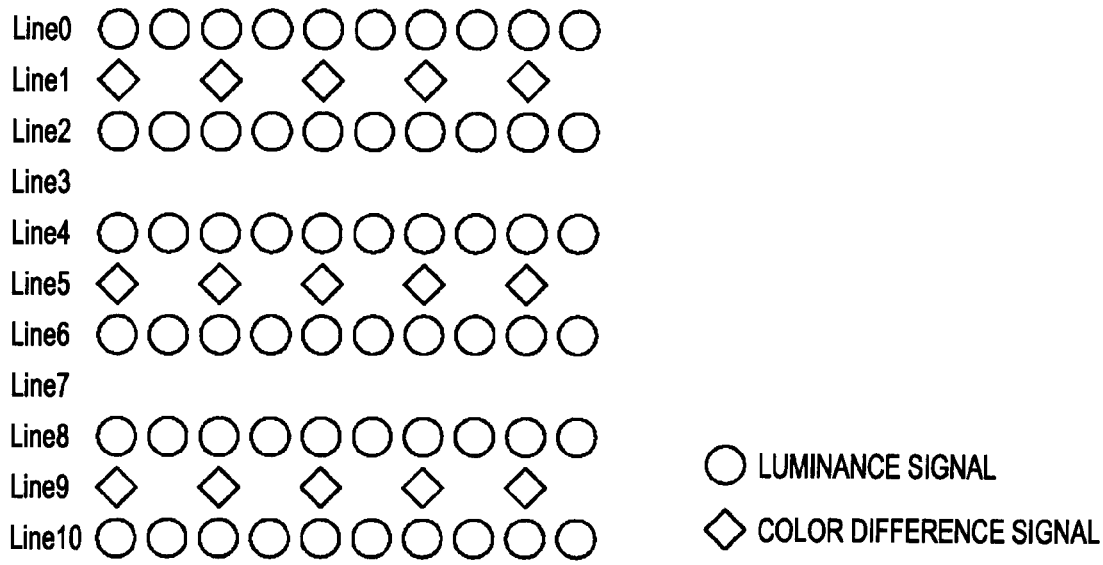
FIG. 3 is a diagram describing an image having the progressive format.

On the other hand, in the case that the video signals have the progressive format, for example, as shown in FIG. 3, one field (frame) worth of image video signals has an information quantity (luminance components and color difference components) included in the video signals of one set of the top field and bottom field. That is to say, one field worth of video signals in the progressive format to be supplied to the video conversion apparatus 11 has an information quantity double of one field worth of video signals in the interlace format.

Note that, in FIG. 3, a single circle and a single square represent a single pixel having a luminance component (luminance signal) and a pixel having color difference components (color difference signals), of the image based on video signals, respectively. Also, the words "Line 0" through "Line 10" are used for representing lines in the horizontal direction in FIG. 3 with one field worth of image, and are actually not included in the images.

In FIG. 3, if we say that the horizontal direction is referred to as the x direction, and the vertical direction is referred to as the y direction, one field worth of image is made up of 10 lines arrayed in the y direction in the same way as one field worth of image shown in FIG. 2.

Also, with one field worth of image, all the pixels making up a certain line have a luminance component, lines having luminance components are arrayed in the y direction with one line interval. Further, of lines adjacent to a line having luminance components in the y direction, only the pixels of a certain line have color difference components, and with a line having color difference components, pixels having color difference components are disposed in the x direction with one pixel interval. Lines having color difference components are arrayed in the y direction with three lines interval.

With one field worth of image in the progressive format in FIG. 3, a pixel positioned in the same position as a pixel having luminance components on the image of the top field or bottom field in FIG. 2 inevitably has a luminance component, but the other pixels on the image shown in FIG. 3 have no luminance component. Similarly, with the image shown in FIG. 3, a pixel positioned in the same position as a pixel having color difference components on the image of the top field or bottom field in FIG. 2 inevitably has color difference components, but the other pixels on the image shown in FIG. 3 have no color difference component.

Figure 4:
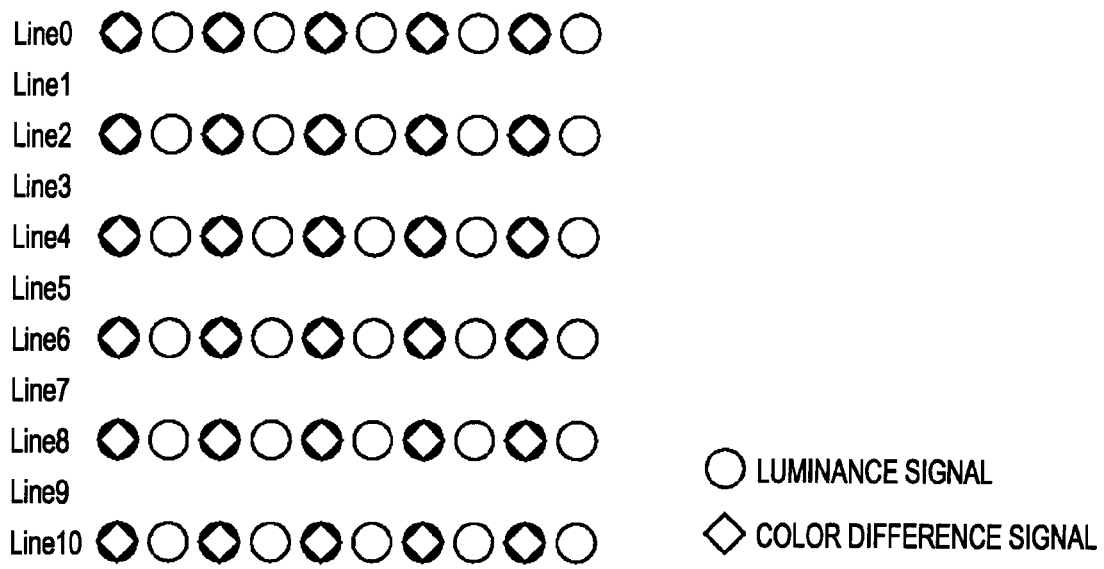
FIG. 4 is a diagram describing an image of which the color difference format is 4:2:2.

Further, the video signals in the progressive format output from the video conversion apparatus 11 have color difference components double of the video signals shown in FIG. 3, for example, as shown in FIG. 4.

Note that, in FIG. 4, a single circle and a single square represent a single pixel having a luminance component (luminance signal) and a single pixel having color difference components (color difference signals), of the image based on the video signals, respectively, and a pixel where a circle and a square are overlapped is a pixel having both of a luminance component and color difference components. Also, the words "Line 0" through "Line 10" are used for representing lines in the horizontal direction in the FIG. 4 with one field worth of image, and are actually not included in the images.

In FIG. 4, if we say that the horizontal direction is referred to as the x direction, and the vertical direction is referred to as the y direction, one field worth of image is made up of 10 lines arrayed in the y direction in the same way as one field worth of image shown in FIGS. 2 and 3.

With the image in FIG. 4, a line in the same position as a line having luminance components in FIG. 3, in more detail, all the pixels making up the line thereof have luminance components. Also, with the image in FIG. 4, all the pixels adjacent to the y direction have color difference components as to a pixel on the same position (phase) as a pixel having color difference components in FIG. 3. That is to say, the image in FIG. 3 and the image in FIG. 4 have the same phase in the y direction (vertical direction) of a pixel having color difference components, and further, with the image in FIG. 4, a pixel having color difference components also inevitably has a luminance component.

Note that the phase of a pixel having color difference components of the images shown in FIGS. 2 through 4 is a phase assuming a case where the encoding method of video signals is the MPEG2 method, and the phase of a pixel having color difference components is not the same as the examples in FIGS. 2 through 4 in all cases.

Figure 5:
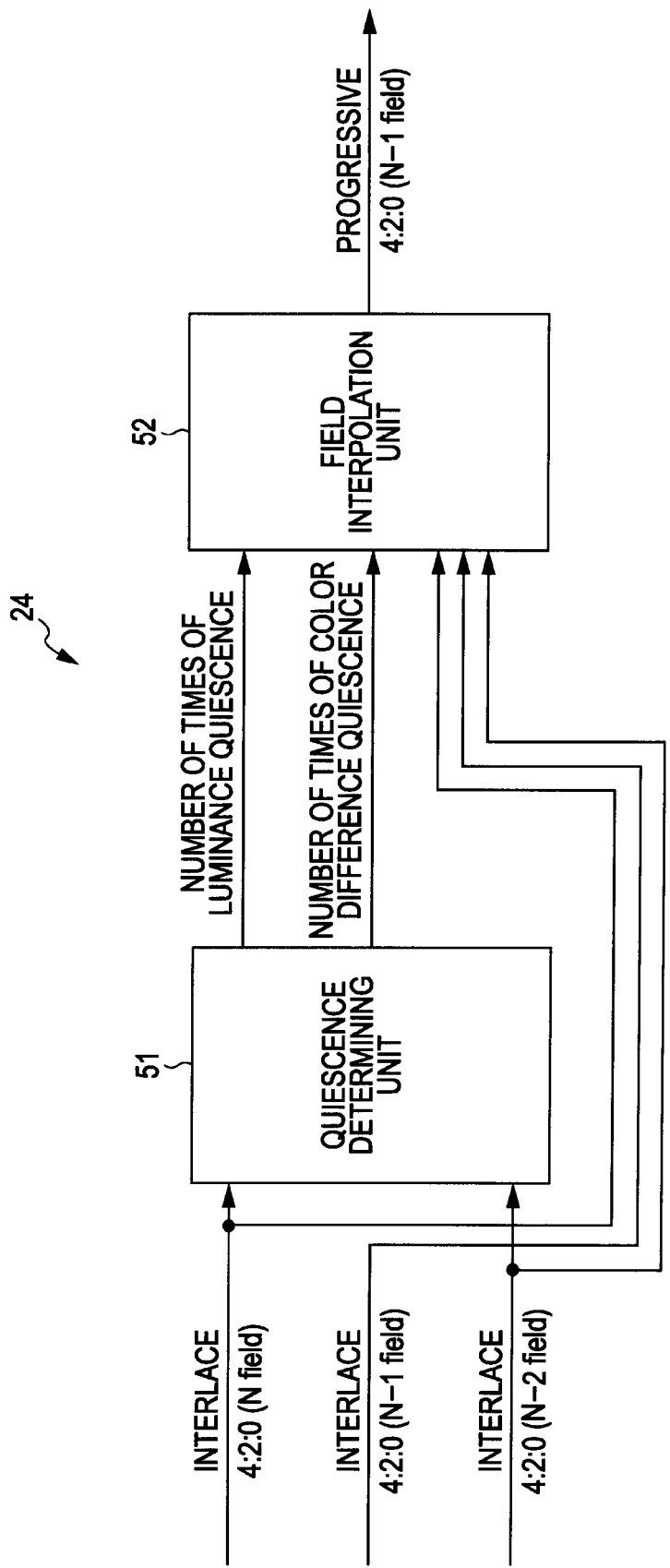
FIG. 5 is a diagram illustrating a configuration example of an IP conversion unit.

Next, FIG. 5 is a diagram illustrating a configuration example of the IP conversion unit 24 in FIG. 1. The IP conversion unit 24 is configured of a quiescence determining unit 51 and a field interpolation unit 52.

The video signals supplied to the video conversion apparatus 11, and the video signals from the frame buffer 22 are supplied to the quiescence determining unit 51. Also, the video signals supplied to the video conversion apparatus 11, the video signals from the frame buffer 21, and the video signals from the frame buffer 22 are supplied to the field interpolation unit 52.

The quiescence determining unit 51 uses fields temporally before and after the field to be processed that has been supplied, i.e., the video signals of the fields N and (N−2) to obtain the number of times of luminance quiescence and the number of times of color difference quiescence regarding the video signals of the field (N−1).

The number of times of luminance quiescence means the number of fields where the luminance component of a pixel on the image of the field (N−1) is in a quiescent state, i.e., the number of fields where the luminance component of a pixel is not changed and still keeps generally a fixed value. Similarly, the number of times of color difference quiescence means the number of fields where the color difference components of a pixel on the image of the field (N−1) are in a quiescent state, i.e., the number of fields where the color difference components of a pixel are not changed and still keeps generally a fixed value. The obtained number of times of luminance quiescence and the obtained number of times of color difference are supplied from the quiescence determining unit 51 to the field interpolation unit 52.

The field interpolation unit 52 uses the supplied video signals, and the number of times of luminance quiescence and the number of times of color difference quiescence from the quiescence determining unit 51 to convert the video format of the video signals of the field (N−1) serving as a processing target from the interlace format to the progressive format. Subsequently, the field interpolation unit 52 supplies the video signals obtained by the conversion to the video selecting unit 25.

Note that the number of times of luminance quiescence and the number of times of color difference quiescence are obtained regarding each pixel, which is an pixel on the image of the field (N−1) serving as a processing target, of which the luminance component and color difference components are interpolated by an IP conversion process.

Figure 6:
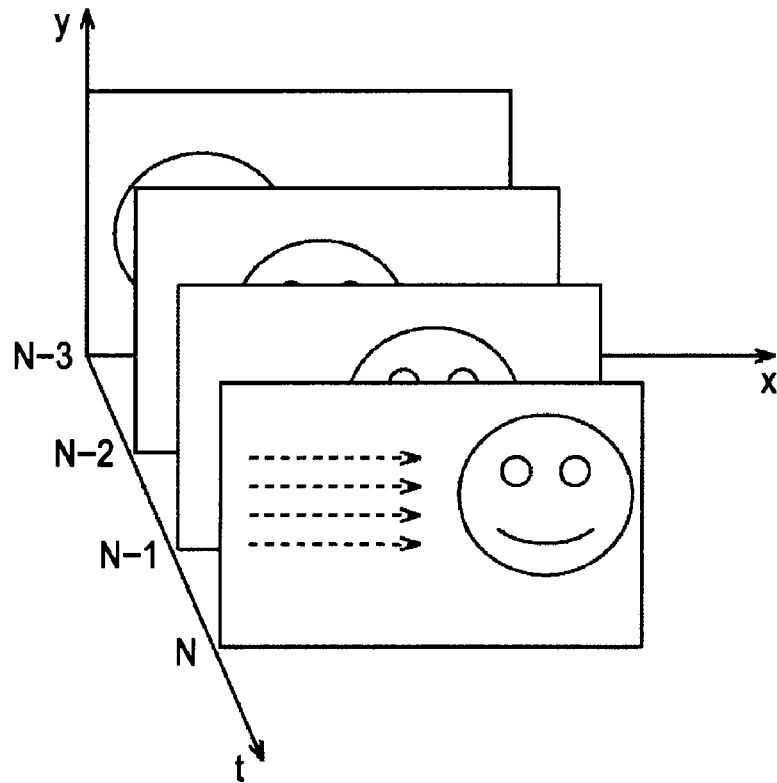
FIG. 6 is a diagram illustrating an example of the image of each field to be input.

For example, as shown in FIG. 6, let us say that the video signals of a moving image on which an object moves to the right direction in the drawing have been supplied to the IP conversion unit 24. Note that, in FIG. 6, the front direction represents time, and the horizontal direction and vertical direction represent the x direction and y direction respectively. Also, in FIG. 6, a single rectangle represents the image of a single field, and let us say that there are the images of fields N through (N−3) in order from the front side to the depth direction.

In the case that such video signals have been supplied, the quiescence determining unit 51 uses the image of each field based on the video signals to determine whether or not the picture pattern of the image is temporally in a quiescent state for each pixel, i.e., whether or not there is the motion of each pixel. Subsequently, based on the determination result thereof, the quiescence determining unit 51 obtains the number of times of luminance quiescence and the number of times of color difference quiescence that indicate how many fields each pixel is temporally in a quiescent state regarding the luminance component and color difference components thereof.

Figure 7:
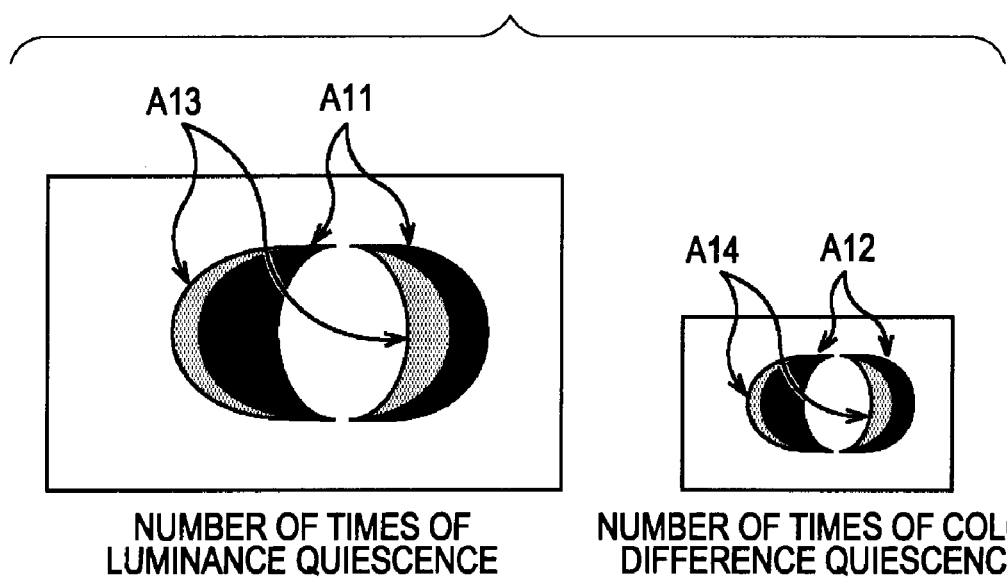
FIG. 7 is a diagram describing the number of times of luminance quiescence, and the number of times of color difference quiescence.

With the example in FIG. 6, an object around the center of the image of each field moves to the x direction, and accordingly, as shown in FIG. 7, the number of times of luminance quiescence and the number of times of color difference quiescence ought to decrease regarding a pixel around the center of the image, and increase regarding a pixel near the edge of the image.

Note that, in FIG. 7, a rectangle on the left side indicates an image made up of a pixel of which the number of times of luminance quiescence is obtained, and a rectangle on the right side indicates an image made up of a pixel of which the number of times of color difference quiescence is obtained. The color difference format of the video signals to be processed is 4:2:0, and the quantities (number of pixels) of color difference components included in the image thereof are a half of the luminance components both in the x direction and y direction, and accordingly, the image of the number of times of color difference quiescence is an image having a half size vertically and horizontally as to the image of the number of times of luminance quiescence.

Also, in FIG. 7, the shading of each region on the image indicates the number of times of luminance quiescence or the number of times of color difference quiescence, which indicates that the deeper the density of the region of a pixel is, the greater the number of times is. With the example in FIG. 7, the density (brightness) of a pixel determined to have been in a quiescent state for a certain period of time or more is clipped.

For example, with the image based on the video signals in FIG. 6, the object moves to the x direction (horizontal direction). Therefore, with the image of the number of times of luminance quiescence and the image of the number of times of color difference quiescence, a portion near the border between the object and the background (region including no motion), i.e., the regions indicated with arrows A11 and A12 have the deepest (darkest) density.

The number of times determined to be in a quiescent state increases as viewed from the regions indicated with the arrows A11 and A12 to the opposite direction of the moving direction of the object, i.e., the region on the left side, and accordingly, the density becomes lighter (brighter) gradually. That is to say, the densities of the regions indicated with the arrows A13 and A14 adjacent to the left side of the regions indicated with the arrows A11 and A12 are lighter as compared to the regions indicated with the arrows A11 and A12. Also, as compared to the regions indicated with the arrows A13 and A14, the densities of regions on the left side of these regions in the drawing are further lighter.

Figure 8:
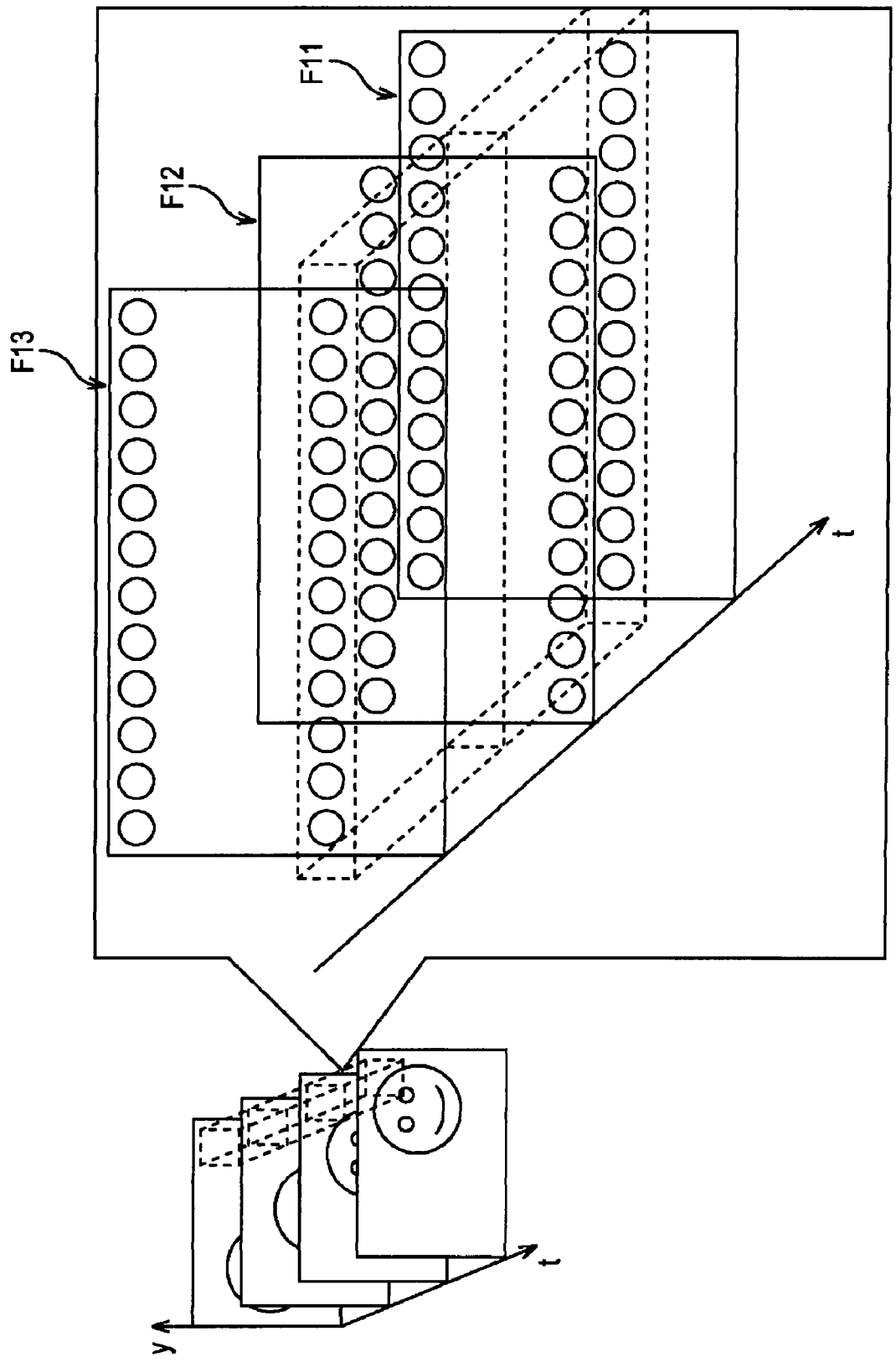
FIG. 8 is a diagram describing calculations of the number of times of luminance quiescence, and the number of times of color difference quiescence.

Also, the number of times of luminance quiescence and the number of times of color difference quiescence are obtained regarding a pixel wherein the luminance components and color difference components of the image of the field (N−1) are interpolated, and accordingly, as shown in FIG. 8, fields temporally before and after the field (N−1) are used for these calculations.

Note that FIG. 8 is a diagram wherein a portion of the image of each field shown in FIG. 6 is enlarged, wherein the vertical direction and horizontal direction represent the y direction and x direction respectively. Also, in FIG. 8, the rectangle indicated with each of arrows F11 through F13 represents a partial region of the images of the fields N through (N−2), and a circle on each image represents a single pixel.

With the quiescence determining unit 51, the number of times of luminance quiescence and the number of times of color difference quiescence are obtained regarding a pixel of the image of the field (N−1) serving as a processing target.

For example, let us consider a case where the number of times of luminance quiescence of a pixel included in a region surrounded with a dotted line in the drawing, which is a pixel of the image of the field (N−1), is obtained. In FIG. 8, let us say that a pixel represented with a circle is a pixel having a luminance component. Here, a line made up of pixels within a dotted line on the image of each field is a line where the phases of the pixels are equal mutually, i.e., a line positioned in the same position on the image of each field.

Specifically, for example, if we say that the field (N−1) indicated with the arrow F12 is the top field shown in FIG. 2, the fields N and (N−2) indicated with the arrows F11 and F13 are taken as the bottom field shown in FIG. 2.

Also, in FIG. 8, if we say that a region on the image of the field (N−1) surrounded with a dotted line is a region equivalent to the Line 2 shown in FIG. 2, each pixel on the Line 2 is a pixel of which the luminance component is interpolated by the IP conversion process, and accordingly, these pixels have no luminance component at the stage before the IP conversion process. Therefore, it is difficult to obtain the number of times of luminance quiescence of a pixel on the Line 2 thereof by the video signals of the field (N−1) alone.

Therefore, the video signals of the fields N and (N−2) where a pixel on the Line 2 has a luminance component is used, thereby obtaining the number of times of luminance quiescence of a pixel of the field (N−1).

That is to say, the field (N−1) is the top field, and on the other hand, the fields N and (N−2) are the bottom fields. Therefore, with the images of these fields, in FIG. 8, pixels within a region surrounded with a dotted line, i.e., all the pixels on the Line 2 in FIG. 2 have a luminance component.

Therefore, the quiescence determining unit 51 obtains the number of times of luminance quiescence of a pixel of interest on the Line 2 of the field (N−1) based on the luminance components of pixels on the images of the fields N and (N−2), positioned in the same position as the pixel of interest thereof.

Also, even in the case that the number of times of color difference quiescence is obtained, in the same way as with the case of the number of times of luminance quiescence, the quiescence determining unit 51 obtains the number of times of color difference quiescence of a pixel of the field (N−1) based on the color difference components of pixels of the images of the fields N and (N−2), positioned in the same position as that pixel.

It can be said that obtaining the number of times of luminance quiescence and the number of times of color difference quiescence is obtaining a period of time wherein whether or not there is temporal change in the luminance component and color difference components of a predetermined pixel is detected, and no change is detected regarding the luminance component and color difference components thereof. That is to say, the number of times of luminance quiescence and the number of times of color difference quiescence are the number of times (number of fields) wherein the quiescence regarding luminance components and color difference components has been detected, respectively.

Figure 9:
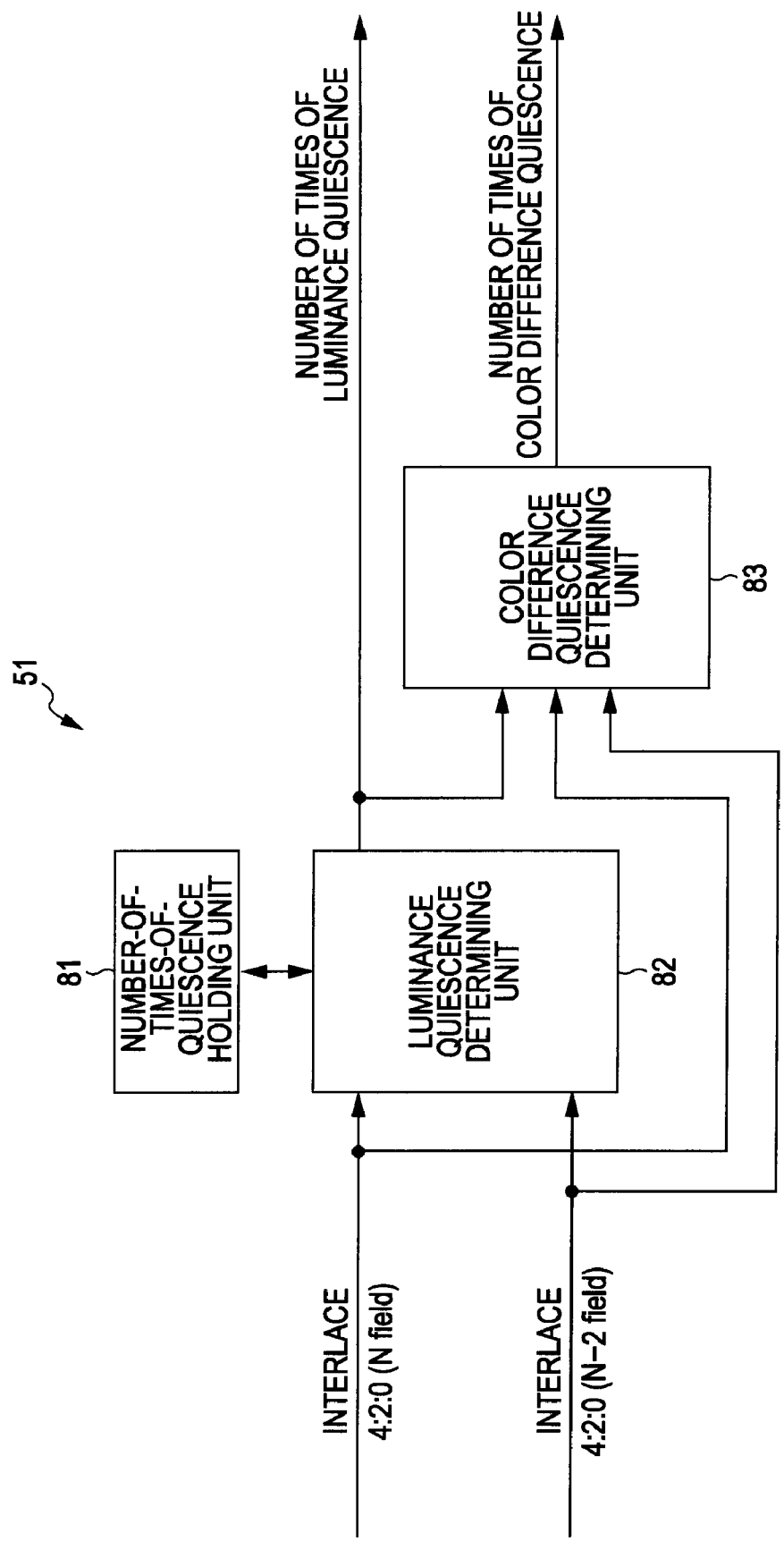
FIG. 9 is a diagram illustrating a configuration example of a quiescence determining unit.

The quiescence determining unit 51 thus obtaining the number of times of luminance quiescence and the number of times of color difference quiescence is configured in more detail such as shown in FIG. 9. Specifically, the quiescence determining unit 51 is configured of a number-of-times-of-quiescence holding unit 81, a luminance quiescence determining unit 82, and a color difference quiescence determining unit 83.

The number-of-times-of-quiescence holding unit 81 holds the number of times of luminance quiescence of a pixel on the image based on the video signals, obtained by the luminance quiescence determining unit 82, and updates the held number of times of luminance quiescence each time a new number of times of luminance quiescence is supplied from the luminance quiescence determining unit 82.

Updating of the number of times of luminance quiescence is executed only regarding a pixel of which the number of times of luminance quiescence is obtained at the same field as the field to be processed, i.e., at either the top field or the bottom field. Therefore, for example, in the case that the field to be processed is the top field, only the number of times of luminance quiescence of a pixel of which the number of times of luminance quiescence is obtained at the top field is updated, but a pixel of which the number of times of luminance quiescence is obtained at the bottom field is not updated.

The video signals of the field N input to the video conversion apparatus 11, and the video signals of the field (N–2) output from the frame buffer 22 are supplied to the luminance quiescence determining unit 82. The luminance quiescence determining unit 82 uses the supplied video signals to obtain the number of times of luminance quiescence for each pixel of the image of the field (N–1) serving as a processing target with reference to the number of times of luminance quiescence held at the number-of-times-of-quiescence holding unit 81. Subsequently, the luminance quiescence determining unit 82 supplies the obtained number of times of luminance quiescence to the color difference quiescence determining unit 83 and the field interpolation unit 52, and supplies the number of times of luminance quiescence to the number-of-times-of-quiescence holding unit 81 to hold this.

The video signals of the field N input to the video conversion apparatus 11, and the video signals of the field (N–2) output from the frame buffer 22 are supplied to the color difference quiescence determining unit 83. The color difference quiescence determining unit 83 uses the supplied video signals, and the number of times of luminance quiescence from the luminance quiescence determining unit 82 to obtain the number of times of color difference quiescence for each pixel of the image of the field (N–1) serving as a processing target, and supplies the obtained number of times of color difference quiescence to the field interpolation unit 52.

Figure 10:
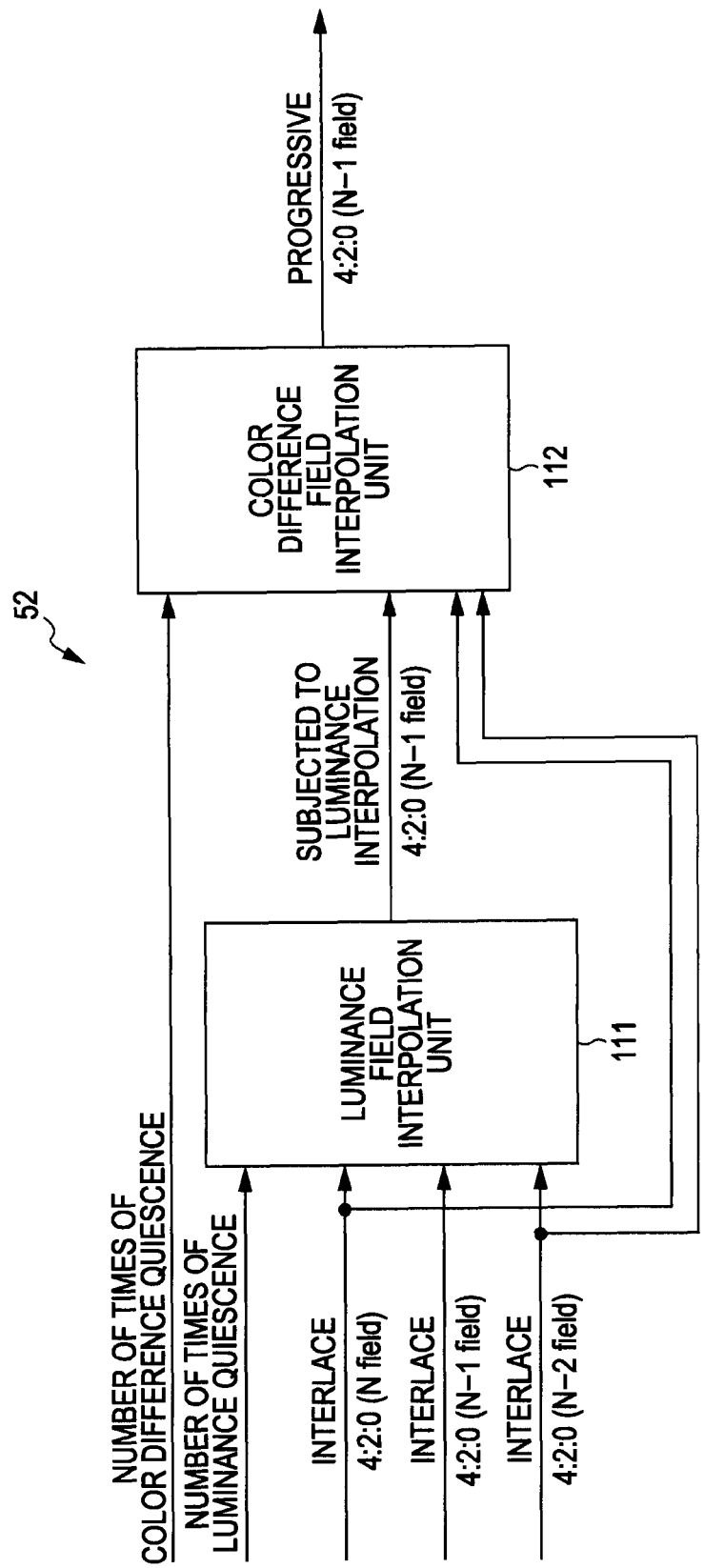
FIG. 10 is a diagram illustrating a configuration example of a field interpolation unit.

Also, the field interpolation unit 52 which receives supply of the number of times of luminance quiescence and the number of times of color difference quiescence, and converts the video format of the video signals of the field (N–1) serving as a processing target is configured in more detail such as shown in FIG. 10. Specifically, the field interpolation unit 52 is configured of a luminance field interpolation unit 111 and a color difference field interpolation unit 112.

The video signals of the field N input to the video conversion apparatus 11, the video signals of the field (N–1) output from the frame buffer 21, and the video signals of the field (N–2) output from the frame buffer 22 are supplied to the luminance field interpolation unit 111.

The luminance field interpolation unit 111 uses the supplied video signals, and the number of times of luminance quiescence from the luminance quiescence determining unit 82 to interpolate the luminance component of a pixel of the image of the field (N–1) serving as a processing target. The pixel of which the luminance component is obtained by the interpolation is, of pixels having no luminance component on the image of the field (N–1), the pixel positioned in the same position as the pixel having a luminance component of the image having the progressive format in FIG. 3. The luminance field interpolation unit 111 supplies the video signals of the image of the field (N–1), of which the luminance component has been interpolated, to the color difference field interpolation unit 112.

Also, the video signals of the field N input to the video conversion apparatus 11, the video signals of the field (N–2) output from the frame buffer 22, and the video signals of the field (N–1) from the luminance field interpolation unit 111 are supplied to the color difference field interpolation unit 111. The color difference field interpolation unit 112 uses the supplied video signals, and the number of times of color difference quiescence supplied from the color difference quiescence determining unit 83 to interpolate the color difference components of a pixel of the image of the field (N–1) serving as a processing target.

The pixel of which the color difference components are obtained by the interpolation is, of pixels having no color difference component on the image of the field (N–1), the pixel positioned in the same position as the pixel having color difference components of the image having the progressive format in FIG. 3. That is to say, for example, if the field (N–1) is the top field, of the pixels of the image of the field thereof, the color difference components of the pixel positioned in the same position as the pixel having color difference components of the image of the bottom field are obtained by the interpolation.

Upon the color difference components of the video signals being interpolated by the color difference field interpolation unit 112, the video signals of the field (N–1) of which the video format is the progressive format and the color difference format is 4:2:0 are obtained. That is to say, the image based on the video signals obtained by the interpolation becomes the same image as the image shown in FIG. 3. The color difference field interpolation unit 112 supplies the video signals of the field (N–1) obtained by the interpolation to the video selecting unit 25.

Further, either the video signals obtained at the IP conversion unit 24 or the video signals output from the frame buffer 21 are selected at the video selecting unit 25, and the color difference format of the selected video signals is converted at the color difference format conversion unit 26.

Figure 11:
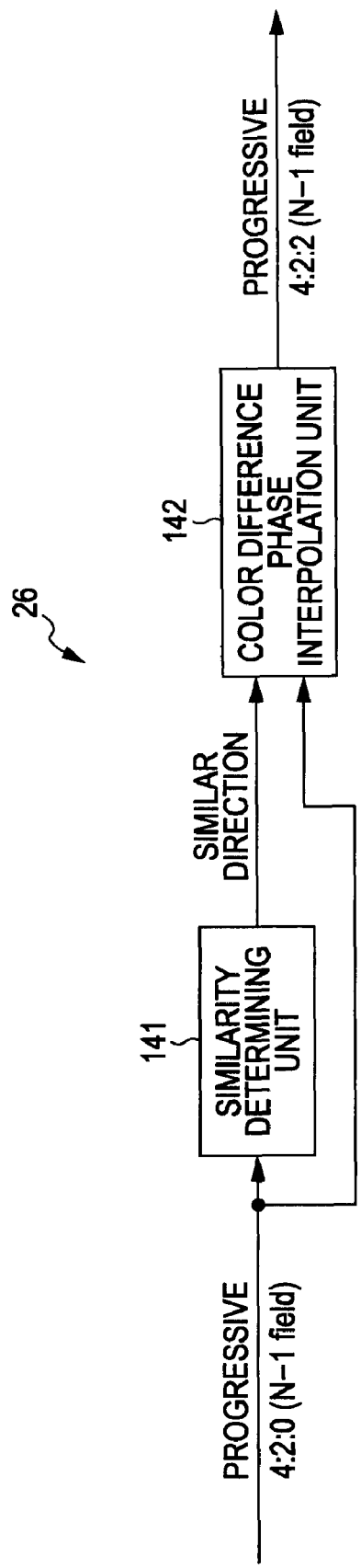
FIG. 11 is a diagram illustrating a configuration example of a color difference format conversion unit.

The color difference format conversion unit 26 in FIG. 1 configured to convert the color difference format of video signals is configured in more detail such as shown in FIG. 11. Specifically, the color difference format conversion unit 26 is configured of a similarity determining unit 141 and a color difference phase interpolation unit 142.

The similarity determining unit 141 uses the video signals from the color difference field interpolation unit 112, and with regard to a pixel of the image based on the video signals thereof, of sets made up of two pixels around the pixel thereof, takes a direction determined from the positional relationship of the pixels of a set wherein the luminance components between pixels are the most similar, as a similar direction. The similarity determining unit 141 supplies the similar direction obtained for each pixel to the color difference phase interpolation unit 142.

Note that, with the image of the field (N–1) serving as a processing target, a pixel of which the similar direction is obtained is a pixel positioned in the intermediate position (phase) between a pixel having color difference components on the image, and another pixel having color difference components, adjacent to that pixel in the y direction.

The color difference phase interpolation unit 142 uses the video signals from the color difference field interpolation unit 112, and the similar direction supplied from the similarity determining unit 141 to interpolate the color difference components of the image based on the video signals of the field (N−1) serving as a processing target. The color difference phase interpolation unit 142 outputs the video signals of which the color difference format is 4:2:2, obtained by the interpolation.

Figure 12:
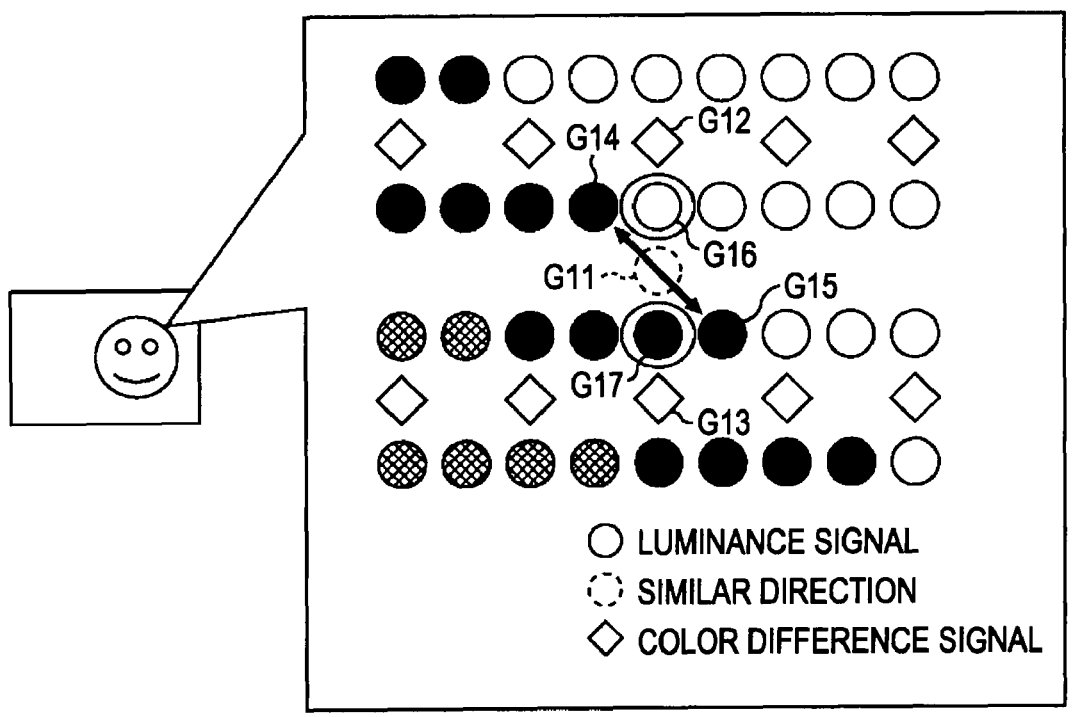
FIG. 12 is a diagram describing a similar direction.

For example, let us say that the video signals of the image shown in FIG. 12 have been supplied to the color difference format conversion unit 26. Note that, in FIG. 12, a single solid-line circle and a single solid-line square represents a pixel having a luminance component and a pixel having color difference components, respectively. In FIG. 12, the vertical direction and the horizontal direction represent the y direction and the x direction, respectively. Also, the shading of a circle that represents a pixel having a luminance component represents the size of the value of the luminance component of the pixel thereof. That is to say, pixels having the same density have the value of the same luminance component.

In FIG. 12, the rectangle on the left side represents the image of the field (N−1), and on the right side in the drawing a partial region on the image of the field (N−1) is illustrated in an enlarged manner.

Now, let us consider obtaining the similar direction of a pixel G11 represented with a dotted-line circle. The pixel G11 is a pixel positioned in the middle between a pixel G12 and a pixel G13 which have color difference components, arrayed in the y direction.

The similar direction of the pixel G11 is determined from a set of pixels wherein the luminance components of pixels are the most similar, of sets of predetermined two pixels, positioned in the vicinity of the pixel G11. For example, if we say that a set of pixels of which the luminance components are the most similar is a set made up of a pixel G14 and a pixel G15, the direction of a straight line that connects between the pixels G14 and G15 is taken as the similar direction.

Note that a predetermined combination of pixels is a combination wherein the pixel G11 of which the similar direction is to be obtained is positioned on a straight line that connects the two pixels. Also, the similar direction is actually information that indicates two pixels making up a selected set of pixels, e.g., information that indicates the pixels G14 and G15.

Upon the similar direction of the pixel G11 being obtained, the color difference phase interpolation unit 142 uses the obtained similar direction of the pixel G11 to obtain the color difference components of pixels G16 and G17. The pixel G16 is a pixel of the phase between the pixels G11 and G12, and the pixel G17 is a pixel of the phase between the pixels G11 and G13.

Note that though the details of a method for obtaining the color difference components of the pixels G16 and G17 will be described later, the color difference components of the pixels G16 and G17 are obtained from a pixel near the pixel G11 determined from the similar direction, which has color difference components, and the pixels G12 and G13. The color difference components of the video signals of the field (N−1) of the progressive format are thus interpolated, whereby the video signals of the field (N−1) of which the color difference format is 4:2:2 and the video format is the progressive format are obtained.

Operation of Video Conversion Apparatus

Next, the operation of the video conversion apparatus 11 described above will be described. The video signals are supplied to the video conversion apparatus 11, and upon output of video signals of which the video format is the progressive format and the color difference format is 4:2:2 being instructed, the video conversion apparatus 11 starts a video conversion process wherein the supplied video signals are converted into video signals having the specified format, and the converted video signals are output.

The video conversion process by the video conversion apparatus 11 will be described below with reference to the flowchart in FIG. 13.

In step S11, the video format determining unit 23 determines, based on the video signals of the field (N−1) supplied from the frame buffer 21, whether or not the video signals thereof are video signals having the interlace format, and supplies the determination result thereof to the video selecting unit 25.

For example, with the header of video signals, a region where the video format of the video signals thereof is described is provided, and the video format determining unit 23 references the header of the supplied video signals to determine whether the video signals have the interlace format or progressive format.

In the case that determination is made in step S11 that the supplied video signals are video signals in the interlace format, in step S12 the IP conversion unit 24 executes an IP conversion process. Note that, though the details of the IP conversion process will be described later, with the IP conversion process, the video format of the video signals of the field (N−1) supplied from the frame buffer 21 to the IP conversion unit 24 is converted from the interlace format to the progressive format.

Subsequently, the video signals subjected to the IP conversion process are supplied from the IP conversion unit 24 to the video selecting unit 25, and then the process proceeds to step S13.

On the other hand, in the case that determination is made in step S11 that the supplied video signals are not video signals having the interlace format, the video signals are already in the progressive format, and accordingly, the process in step S12 is skipped, and the process proceeds to step S13.

In the case that the IP conversion process has been executed in step S12, or in the case that determination is made in step S11 that the supplied video signals are not video signals having the interlace format, in step S13 the video selecting unit 25 selects the video signals based on the determination result from the video format determining unit 23.

That is to say, in the case that the determination result from the video format determining unit 23 is a determination result to the effect that the video format of the video signals of the field (N−1) is the interlace format, the video selecting unit 25 selects the video signals supplied from the color difference field interpolation unit 112 of the IP conversion unit 24.

On the other hand, in the case that the determination result from the video format determining unit 23 is a determination result to the effect that the video format of the video signals of the field (N−1) is the progressive format, the video selecting unit 25 selects the video signals supplied from the frame buffer 21.

The video selecting unit 25 supplies the selected video signals to the similarity determining unit 141 and color difference phase interpolation unit 142 of the color difference format conversion unit 26.

In step S14, the color difference format conversion unit 26 executes a color difference format conversion process to convert the color difference format of the video signals supplied from the video selecting unit 25 from 4:2:0 to 4:2:2, and outputs the video signals obtained as a result thereof. Thus, the video signals of which the video format is the progressive format and the color difference format is 4:2:2 are output. Note that the details of the color difference format conversion process will be described later.

In step S15, the video conversion apparatus 11 determines whether or not the process is to be ended. For example, in the case that supply of the video signals to the video conversion apparatus 11 has been completed, and the color difference formats of the video signals of all the fields have been converted, determination is made that the process is to be ended.

In the case that determination is made in step S15 that the process is not to be ended, the process returns to step S11, where the above-mentioned process is repeated. That is to say, the next field is taken as a processing target, and the color difference format of the video signals of the field thereof is converted.

On the other hand, in the case that determination is made in step S15 that the process is to be ended, each unit of the video conversion apparatus 11 ends the executing process, and the video conversion process is ended.

In the case that the video format of the supplied video signals is the interlace format, the video conversion apparatus 11 converts the video format of the video signals thereof into the progressive format, and further converts the color difference format of the video signals having the progressive format, and outputs the converted video signals.

Thus, in the case that the video format of the supplied video signals is the interlace format, the video format of the video signals is converted into the progressive format, and then the color difference format thereof is converted, whereby deterioration in the image quality of the image based on the video signals can be suppressed.

That is to say, with the related art, first the color difference format of the video signals has been converted from 4:2:0 to 4:2:2. For example, let us say that the color difference format of the image of the top field shown in the left side in FIG. 2 is converted, regions from Line 0 to Line 6 of the image are blue regions, and regions from Line 7 to Line 10 are red regions.

Now, in the case that, of the Line 4 in the drawing, the leftmost pixel is taken as a pixel of interest, and the color difference components of the pixel of interest thereof are obtained by interpolation, with the related art the color difference components of the pixel of interest have been obtained from the leftmost pixel of the Line 1 and the leftmost pixel of the Line 9. In this case, the leftmost pixel of the Line 1 is a pixel of a blue region, and the leftmost pixel of the Line 9 is a pixel of a red region, and accordingly, the color difference components of the pixel of interest have a value that indicates a color wherein red and blue are mixed.

Also, the regions from the Line 0 to Line 6 are blue regions, and accordingly, the color difference components of the leftmost pixel of the Line 5 of the bottom field following the top field have a value that indicates blue. Therefore, upon two images ultimately obtained from these consecutive fields being displayed in order, a line of a color wherein red and blue are mixed appears to be displayed within a blue region in the eyes of an observer, and accordingly, the image quality of the images is deteriorated.

On the other hand, with the video conversion apparatus 11, the video format of the video signals is converted, and then the conversion of the color difference format is executed.

For example, with the image of the top field shown in the left side in FIG. 2, let us consider taking, of the Line 5 in the drawing, the leftmost pixel as a pixel of interest, and the color difference components of the pixel of interest thereof are obtained, thereby converting the video format of the video signals.

Now, let us say that the regions from the Line 0 to Line 6 of the image of each field in FIG. 2 are blue regions, and the regions from the Line 7 to Line 10 are red regions. In this case, if only a pixel spatially near a pixel of interest is used to interpolate the color difference components of the pixel of interest, deterioration in image quality is small as compared to the case of the related art.

That is to say, in the case that the color difference components of the pixel of interest are obtained from the leftmost pixel of the Line 1 and the leftmost pixel of the Line 9, the color difference components of the pixel of interest have a value that indicates a color wherein red and blue are mixed in the same way as with the related art. However, upon comparing the pixel of interest on the image of the top field, and the pixels of the image of the bottom field temporally following the top field thereof, all the color difference components of the pixels on the image of the bottom field, lower side than the pixel of interest in the drawing, have a value that indicates red.

Therefore, even if two images ultimately obtained from the images of these consecutive fields are displayed, a line of a color wherein red and blue are mixed is not displayed within a blue region. That is to say, as compared to the case of converting the video format after converting the color difference format, deterioration in the image quality of the images can be prevented.

Note that if the video signals in the progressive format of which the deterioration in the color component is small are used to convert the color difference format of the video signals thereof, the deterioration thereof is less than the deterioration in image quality due to the conversion of the color difference format. Therefore, in the case that the video signals of which the color difference format is 4:2:2 and the video format is the progressive format are obtained from the video signals of which the color difference format is 4:2:0 and the video format is the interlace format, video signals with higher image quality can be obtained ultimately as compared to the method according to the related art.

As described above, after the video format of the video signals is converted into the progressive format, the color difference format thereof is converted, whereby the image quality of the image based on the video signals can be improved.

Next, the IP conversion process corresponding to the process in step S12 in FIG. 13 will be described with reference to the flowchart in FIG. 14.

In step S41, the luminance quiescence determining unit 82 executes quiescence determination of the luminance component of the image of the field (N−1) from the supplied video signals of the fields N and (N−2), and the number of times of luminance quiescence held at the number-of-times-of-quiescence holding unit 81.

Figure 15:
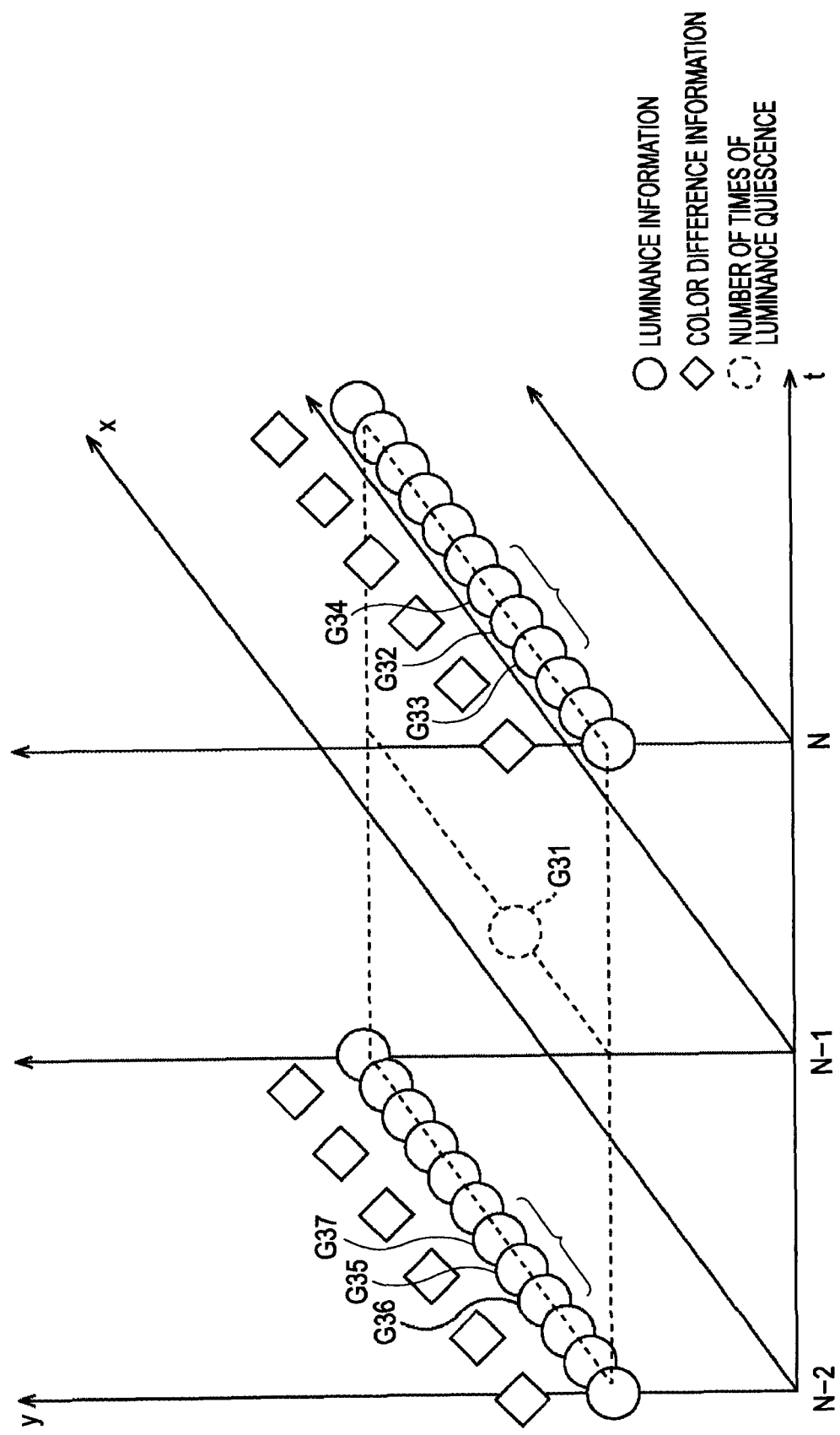
FIG. 15 is a diagram describing the number of times of luminance quiescence.

For example, as shown in FIG. 15, in the case that the number of times of luminance quiescence of a pixel G31 on the image of the field (N−1) is obtained, the luminance quiescence determining unit 82 uses a pixel near the same position as the pixel G31 of the images of the fields N and (N−2) to obtain the number of times of luminance quiescence.

Note that, in FIG. 15, the horizontal direction represents time, and the vertical direction and depth direction represent the y direction and x direction respectively. Also, in FIG. 15, a single solid-line circle and a single solid-line square represent a pixel having a luminance component and a pixel having color difference components, of the image of each field, respectively.

Further, positions corresponding to point-in-time t=N, N−1, and N−2 represent the positions of the fields N through (N−2), and a circle or square at the position of the point-in-time t represents a pixel on the image of the field determined with the point-in-time t.

First, the luminance quiescence determining unit 82 uses the values of the luminance components of several pixels consecutively adjacent to a pixel G32 in the x direction with the pixel G32 of the same phase as the pixel G31 of the image of the field N as the center to subject the luminance components of the image to a low pass filter (LPF) process in the x direction.

With the example in FIG. 15, the pixel G32, and pixels G33 and G34 adjacent to the pixel G32 thereof in the x direction, are used to execute the LPF process. Now, a value obtained by the LPF process using the pixels G32 through G34 will be referred to as a filter value L-LPF(N).

Similarly, the luminance quiescence determining unit 82 uses the values of the luminance components of several pixels consecutively adjacent to a pixel G35 in the x direction with the pixel G35 of the same phase as the pixel G31 of the image of the field (N−2) as the center to subject the luminance components of the image to the LPF process in the x direction.

With the example in FIG. 15, the pixel G35, and pixels G36 and G37 adjacent to the pixel G35 thereof in the x direction, are used to execute the LPF process. Now, a value obtained by the LPF process using the pixels G35 through G37 will be referred to as a filter value L-LPF(N−2).

Thus, the luminance components of the image of each field are subjected to the LPF process, whereby noise included in the luminance components of the image can be removed, and the quiescence determination of luminance, i.e., determination precision regarding whether or not there is the motion of the luminance component of the pixel G31 can be improved.

Upon obtaining the filter value L-LPF(N) of the field N, and the filter value L-LPF(N−2) of the field (N−2), the luminance quiescence determining unit 82 calculates the absolute value difference L-ABS(N−1) of these filter values.

Next, the luminance quiescence determining unit 82 obtains a threshold L-TH(N−1) used for evaluating the absolute value difference L-ABS(N−1) of the pixel G31 obtained by calculation. The value of the threshold L-TH(N−1) is changed depending on how long the pixel on the image positioned in the same position as the pixel G31 of the images of consecutive fields temporally before the field (N−1) is in a quiescent state (the luminance components are not changed).

If we say that two fields temporally before the field (N−1) serving as a processing target, i.e., the number of times of luminance quiescence of the pixel positioned in the same position as the pixel G31 of the image of the field (N−3) is SL(N−3), the number-of-times-of-quiescence holding unit 81 holds the number of times of luminance quiescence SL(N−3).

The luminance quiescence determining unit 82 determines the value of a threshold L-TH(N−1) from the number of times of luminance quiescence SL(N−3) of the number-of-times-of-quiescence holding unit 81, and a threshold table held beforehand.

Figure 16:
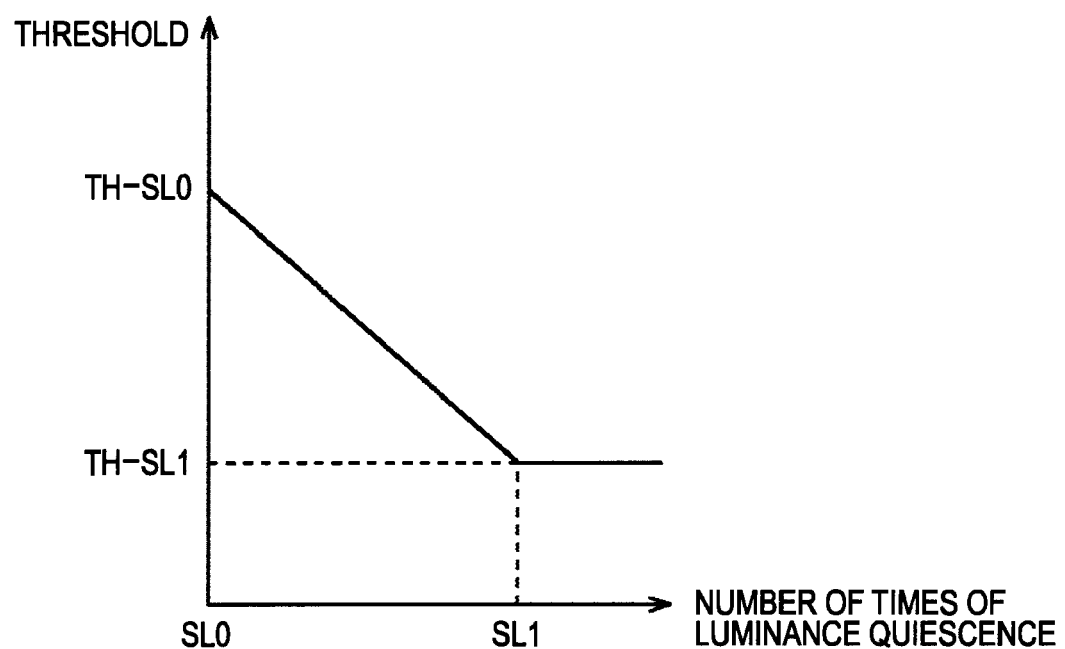
FIG. 16 is a diagram describing a threshold table.

For example, let us say that the threshold table held by the luminance quiescence determining unit 82 is a table wherein the threshold L-TH(N−1) is changed as to the number of times of luminance quiescence (the number of times of luminance quiescence SL(N−3)) such as shown in FIG. 16. Note that, in FIG. 16, the vertical axis represents the value of the threshold L-TH(N−1), and the horizontal axis represents the value of the number of times of luminance quiescence.

With the example in FIG. 16, in the case that the number of times of luminance quiescence is a default value SL0, TH-SL0 is determined to be the value of the threshold L-TH(N−1), and the value of the threshold L-TH(N−1) decreases in proportion to the number of times of luminance quiescence until the number of times of luminance quiescence becomes SL1. That is to say, as the number of times of luminance quiescence increases, the value of the threshold L-TH(N−1) decreases. Subsequently, upon the number of times of luminance quiescence reaching the SL1 or more, the value of the threshold L-TH(N−1) becomes fixed, and TH-SL1 is determined to be the value thereof.

With the determination regarding whether or not there is the motion of the luminance component of the pixel G31, in the case that the absolute value difference L-ABS(N−1) is equal to or smaller than the threshold L-TH(N−1), the pixel G31 is determined to be in a quiescent state, and in the case that the absolute value difference L-ABS(N−1) exceeds the threshold L-TH(N−1), the pixel G31 is determined not to be in a quiescent state.

This is because the absolute value difference L-ABS(N−1) represents the absolute value of the difference between the pixels G32 and G35 having the same phase as the pixel G31, and in the case that the absolute value thereof is small, the luminance component of a pixel having the same phase as the pixel G31 is not changed as such with the fields N through (N−2).

In the case that the threshold L-TH(N−1) determined by such a threshold table is used to determine whether or not there is the motion of the luminance component of the pixel G31, when the number of times of luminance quiescence is relatively small, whether or not there is the motion of the luminance component of the pixel G31 is evaluated loosely with the threshold L-TH(N−1) that is a large value. That is to say, in the case that the pixel having the same phase as the pixel G31 of the past field has determined not to be in a quiescent state, or in the case that time has not elapsed as such since the pixel thereof became a quiescent state, a relatively large value is taken as the threshold L-TH(N−1).

Also, as the number of times of luminance quiescence increases, the threshold L-TH(N−1) that is a smaller value is used, and determination is made more strictly whether or there is the motion of the luminance component of the pixel G31. Further, upon the number of times of luminance quiescence exceeding the SL1, according to the threshold L-TH(N−1) that is a certain size, determination is made whether or there is the motion of the luminance component of the pixel G31. This is arranged to keep determining that the luminance component of the pixel G31 is in a quiescent state, even in the case that a noise component has not been removed completely from the luminance component by the LPF process.

Upon the threshold L-TH(N−1) being thus obtained, the luminance quiescence determining unit 82 compares the threshold L-TH(N−1) and the absolute value difference L-ABS(N−1), and determination is made whether or not there is the motion of the luminance component of the pixel G31.

In the case that the absolute value difference L-ABS(N−1) does not exceed the threshold L-TH(N−1), the luminance quiescence determining unit 82 determines that the luminance component of the pixel G31 is in a quiescent state, and determines a value obtained by adding 1 to the number of times of luminance quiescence SL(N−3) as the number of times of luminance quiescence SL(N−1) of the pixel G31 of the field (N−1).

Also, in the case that the absolute value difference L-ABS(N−1) exceeds the threshold L-TH(N−1), the luminance quiescence determining unit 82 determines that the luminance component of the pixel G31 is not in a quiescent state, and determines a predetermined default value SL0 as the number of times of luminance quiescence SL(N−1) of the pixel G31 of the field (N−1).

Further, the luminance quiescence determining unit 82 supplies the new obtained number of times of luminance quiescence SL(N−1) to the number-of-times-of-quiescence holding unit 81 to update the number of times of luminance quiescence of the pixel equivalent to the pixel G31. The number-of-times-of-quiescence holding unit 81 rewrites the number of times of luminance quiescence SL(N−3) of the pixel equivalent to the pixel G31 using the supplied number of times of luminance quiescence SL(N−1), thereby updating the number of times of luminance quiescence.

Thus, the luminance quiescence determining unit 82 obtains the frequencies of luminance quiescence regarding all the pixels of which the luminance quiescence determination should be executed, i.e., the number of times of luminance quiescence should be obtained. Also, the luminance quiescence determining unit 82 supplies the obtained number of times of luminance quiescence of each pixel to the color difference quiescence determining unit 83 and the luminance field interpolation unit 111.

Note that the threshold table held at the luminance quiescence determining unit 82 is used to determine the determination precision of the quiescence determination of each pixel. That is to say, if the threshold L-TH(N−1) is too great, a pixel of which the luminance component on the image is moving is determined erroneously to be in a quiescent state, and conversely, if the threshold L-TH(N−1) is too small, a pixel of which the luminance component on the image is in a quiescent state is determined erroneously to be moving. A quiescence determination process as to pixels is a very important process to determine the processing capability of the IP conversion process, and accordingly, in general, with calculation of quiescence determination, high computation precision is demanded.

Also, the quiescence determination method for the luminance component of a pixel described above is an example of the quiescence determination, and any kind of method may be employed as long as the number of times of quiescence of a luminance component is obtained in increments of pixels.

Figure 14:
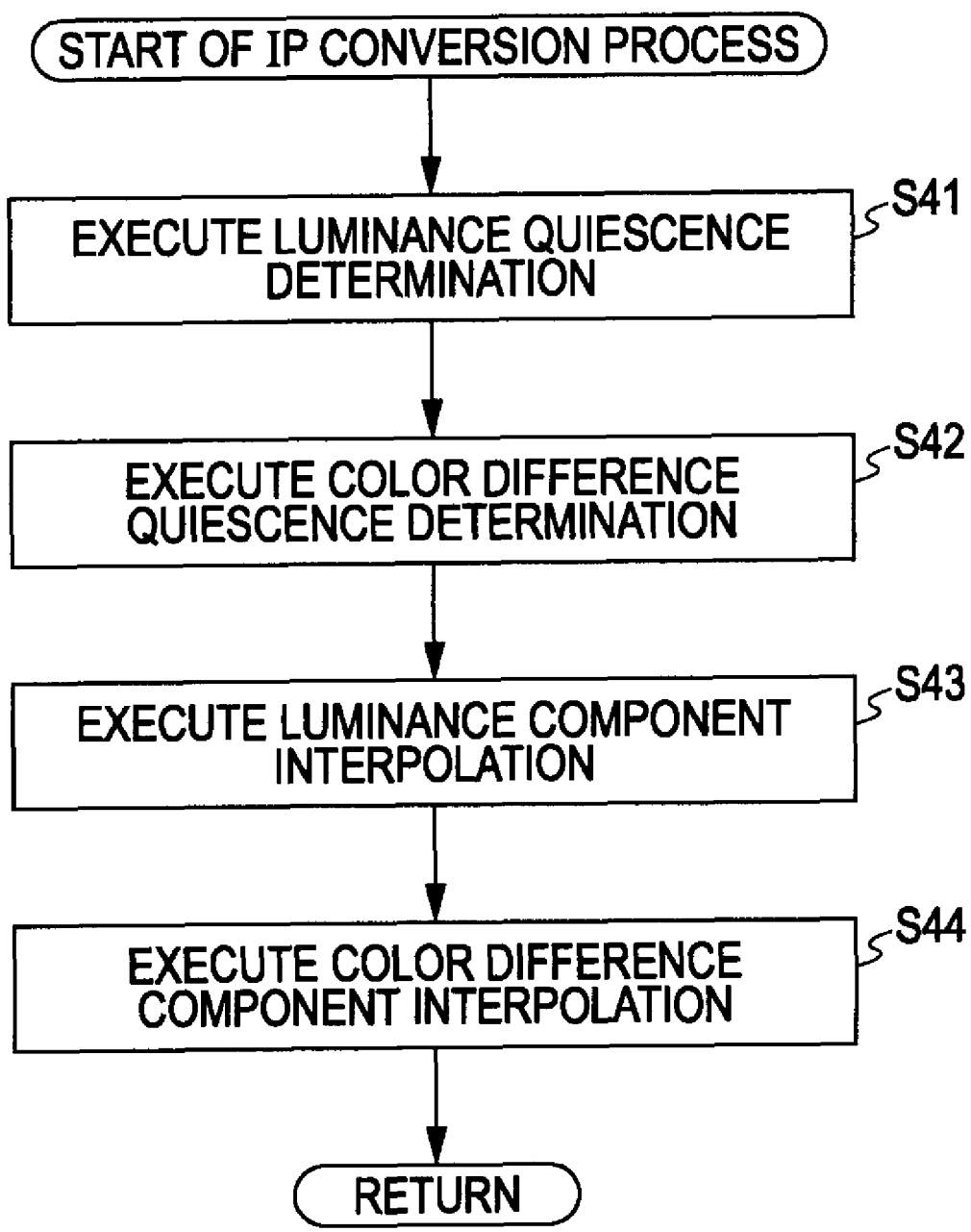
FIG. 14 is a flowchart describing an IP conversion process.

Now, description will return to the flowchart in FIG. 14, where upon the quiescence determination for a luminance component being executed in step S41, the process proceeds to step S42.

In step S42, the color difference quiescence determining unit 83 executes the quiescence determination for the color difference components of the image of the field (N−1) based on the supplied video signals of the fields N and (N−2), and the number of times of luminance quiescence supplied from the luminance quiescence determining unit 82.

Figure 17:
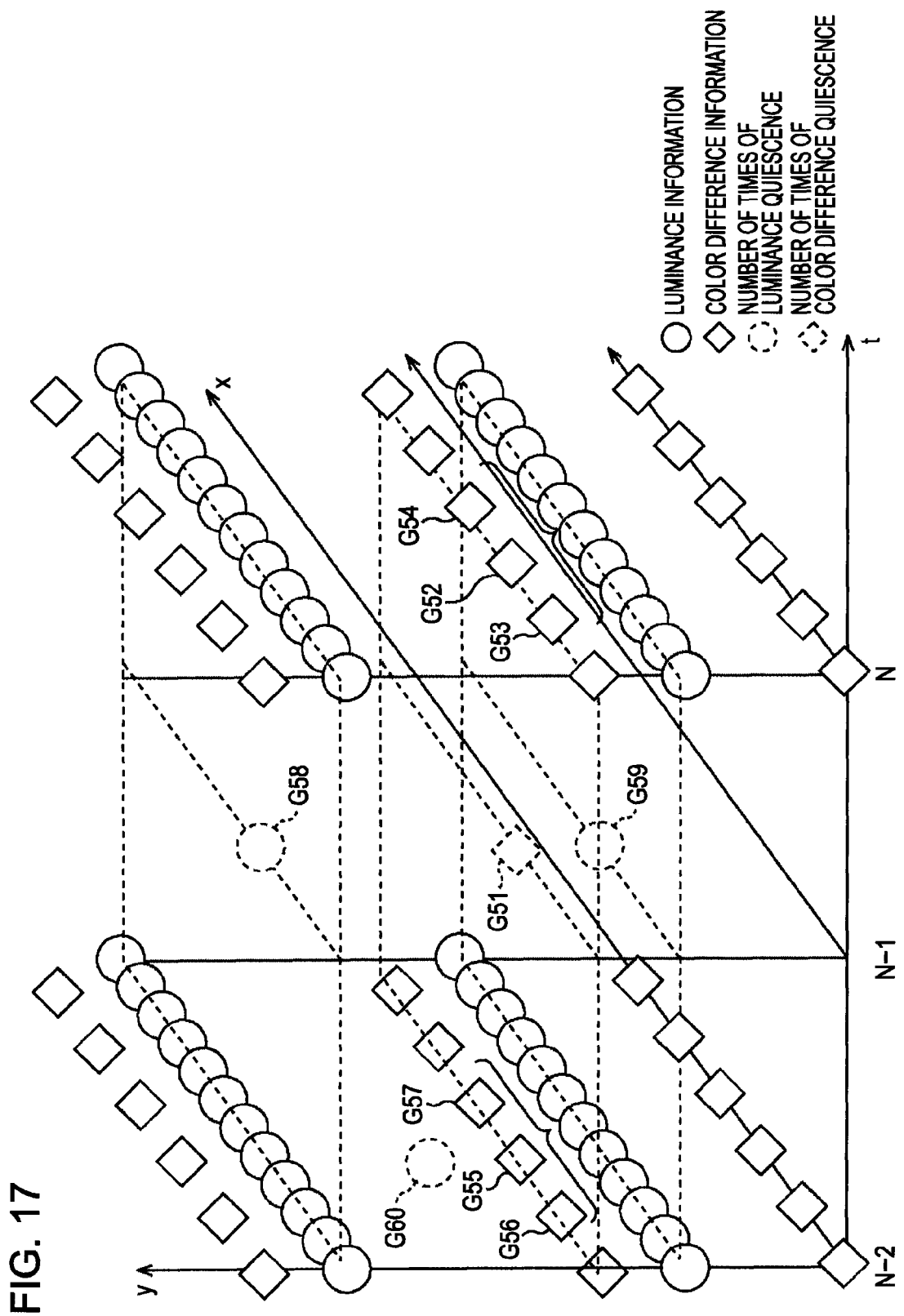
FIG. 17 is a diagram describing the number of times of color difference quiescence.

For example, as shown in FIG. 17, in the case that the number of times of color difference quiescence of a pixel G51 on the image of the field (N−1) is obtained, the color difference quiescence determining unit 83 uses a pixel near the same position as the pixel G51 of the images of the fields N and (N−2) to obtain the number of times of color difference quiescence.

Note that, in FIG. 17, the horizontal direction represents time, and the vertical direction and depth direction are the y direction and x direction respectively. Also, in FIG. 17, a single solid-line circle and a single solid-line square represent a pixel having a luminance component and a pixel having color difference components, of the image of each field, respectively, and a single circle represented with a dotted line represents a pixel of which the number of times of luminance quiescence with the image of each field has been obtained.

Further, positions corresponding to point-in-time t=N, N−1, and N−2 represent the positions of the fields N through (N−2), and a circle or square at the position of the point-in-time t represents a pixel on the image of the field determined with the point-in-time t.

First, the color difference quiescence determining unit 83 uses the values of the color difference components of several pixels consecutively adjacent to a pixel G52 in the x direction with the pixel G52 of the same phase as the pixel G51 of the image of the field N as the center to subject the color difference components of the image to the LPF process in the x direction.

With the example in FIG. 17, the pixel G52, and pixels G53 and G54 adjacent to the pixel G52 thereof in the x direction are used to execute the LPF process. Now, a value obtained by the LPF process using the pixels G52 through G54 will be referred to as a filter value C-LPF(N).

Similarly, the color difference quiescence determining unit 83 uses the values of the color difference components of several pixels consecutively adjacent to a pixel G55 in the x direction with the pixel G55 of the same phase as the pixel G51 of the image of the field (N−2) as the center to subject the color difference components of the image to the LPF process in the x direction.

With the example in FIG. 17, the pixel G55, and pixels G56 and G57 adjacent to the pixel G55 thereof in the x direction are used to execute the LPF process. Now, a value obtained by the LPF process using the pixels G55 through G57 will be referred to as a filter value C-LPF(N−2).

Thus, the color difference components of the image of each field are subjected to the LPF process, whereby noise included in the color difference components of the image can be removed, and the quiescence determination of color difference, i.e., determination precision regarding whether or not there is the motion of the color difference components of the pixel G51 can be improved.

Upon obtaining the filter value C-LPF(N) of the field N, and the filter value C-LPF(N−2) of the field (N−2), the color difference quiescence determining unit 83 calculates the absolute value difference C-ABS(N−1) of these filter values.

Next, the color difference quiescence determining unit 83 obtains a threshold C-TH(N−1) used for evaluating the absolute value difference C-ABS(N−1) of the pixel G51 obtained by calculation. The value of this threshold C-TH(N−1) is obtained by the same process as with threshold L-TH(N−1) of the number of times of luminance quiescence based on the number of times of color difference quiescence of the pixel G51, and the threshold table held at the color difference quiescence determining unit 83 beforehand.

That is to say, of the frequencies of luminance quiescence regarding the pixels G58 and G59 spatially near the pixel G51, and a pixel G60 temporally near the pixel G51, the color difference quiescence determining unit 83 determines the smallest number of times of luminance quiescence as the number of times of color difference quiescence SC(N−1) of the pixel G51.

Here, the pixels G58 and G59 are pixels positioned in the vicinity of the pixel G51 on the image of the field (N−1), having the same position in the x direction as the pixel G51. That is to say, the pixels G51, G58, and G59 are positioned so as to be arrayed in one row in the y direction. Also, the pixel G60 is a pixel on the image of the field (N−2) having the same position in the x direction as the pixel G51.

Thus, the reason why the smallest of the frequencies of luminance quiescence of pixels near the pixel G51 is determined to be the number of times of color difference quiescence SC(N−1) is because, in the case that a luminance component is changed as a picture pattern of the image, the corresponding color difference components are very frequently changed as well.

That is to say, based on assumption that correlation is realized between a luminance component and color difference components, the number of times of luminance quiescence is determined approximately as the number of times of color difference quiescence. Also, in the case that the luminance component of a single pixel near the pixel G51 is not in a quiescent state, for example, even in the case that the luminance component of another pixel nearer the pixel G51 than that pixel is in a quiescent state, the color difference components of the pixel G51 are not in a quiescent state due to influence of a pixel of which the luminance component is moving in some cases.

Therefore, though distance from the pixel G51 to each of the pixels G58 through G60 differs, these pixels are treated equally regardless of the distance from the pixel G51, and the smallest number of times of luminance quiescence of the pixels G58 through G60 is determined to be the number of times of luminance quiescence.

Further, after obtaining the number of times of color difference quiescence SC(N−1) of the pixel G51, the color difference quiescence determining unit 83 obtains a threshold C-TH(N−1) from the number of times of color difference quiescence SC(N−1) thereof, and the threshold table held beforehand.

Figure 18:
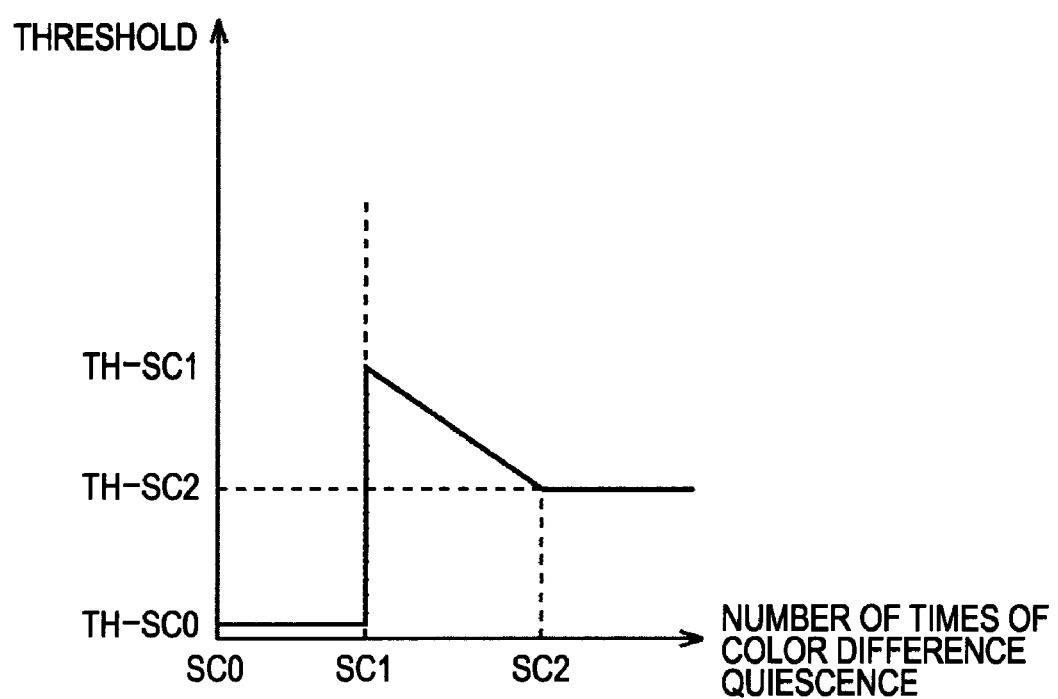
FIG. 18 is a diagram describing a threshold table.

For example, the threshold table held at the color difference quiescence determining unit 83 is a table wherein the threshold C-TH(N−1) is changed as to the number of times of color difference quiescence (number of times of color difference quiescence SC(N−1)) such as shown in FIG. 18. Note that, in FIG. 18, the vertical axis represents the value of the threshold C-TH(N−1), and the horizontal axis represents the value of the number of times of color difference quiescence.

With the example in FIG. 18, when the number of times of color difference quiescence is between a default value SC0 and SC1, TH-SC0 is determined to be the value of the threshold C-TH(N−1), and when the number of times of color difference quiescence is the SC1, TH-SC1 is determined to be the value of the threshold C-TH(N−1). The value of the threshold C-TH(N−1) decreases in proportion to the number of times of color difference quiescence until the number of times of color difference quiescence becomes SC2 from the SC1. That is to say, as the number of times of color difference quiescence increases, the value of the threshold C-TH(N−1) decreases. Further, upon the number of times of color difference quiescence reaching the SC2 or more, the value of the threshold C-TH(N−1) becomes fixed, and TH-SC2 is determined to be the value thereof.

With the determination regarding whether or not there is the motion of the color difference components of the pixel G51, in the case that the absolute value difference C-ABS(N−1) is equal to or smaller than the threshold C-TH(N−1), the pixel G51 is determined to be in a quiescent state, and in the case that the absolute value difference C-ABS(N−1) exceeds the threshold C-TH(N−1), the pixel G51 is determined not to be in a quiescent state.

In the case that the absolute value difference C-ABS(N−1) is below the threshold C-TH(N−1), the color difference quiescence determining unit 83 supplies the obtained number of times of color difference quiescence SC(N−1) to the color difference field interpolation unit 112 as the ultimate number of times of color difference quiescence of the pixel G51 without change. In the case that the absolute value difference C-ABS(N−1) exceeds the threshold C-TH(N−1), there is the motion of the color difference components of the pixel G51, and accordingly, the color difference quiescence determining unit 83 does not supply the obtained number of times of color difference quiescence but "0" to the color difference field interpolation unit 112 as the ultimate number of times of color difference quiescence SC(N−1) of the pixel G51.

Thus, the reason why the absolute value difference C-ABS(N−1) and the threshold C-TH(N−1) are compared, and determination is made whether or not there is the motion of the color difference components of the pixel is as follows. That is to say, the absolute value difference C-ABS(N−1) indicates the absolute value of the difference between the pixels G52 and G55 having the same phase as the pixel G51, and if the absolute value thereof is small, this is because the color difference components of the pixel having the same phase as the pixel G51 are not changed with the fields N through (N−2).

In the case that the threshold C-TH(N−1) determined by the threshold table is used to determine whether or not there is the motion of the color difference components of the pixel G51, when the number of times of color difference quiescence is relatively small, determination is made strictly using the threshold C-TH(N−1) that is a small value. This means that in the case that the number of times of color difference quiescence has not reached a sufficient number of times, the determination result regarding whether or not there is the motion of the color difference components of the pixel G51 using the threshold is low in reliability.

Note that the number of times of color difference quiescence is obtained from the number of times of luminance quiescence by calculation for each field, and accordingly, even if the default threshold C-TH(N−1) is the minimum, when the color difference components of the pixel to be processed are continuously in a quiescent state, the number of times of color difference quiescence thereof increases over time.

Upon the threshold C-TH(N−1) being thus obtained, the color difference quiescence determining unit 83 compares the threshold C-TH(N−1) and the absolute value difference C-ABS(N−1) to determine whether or not there is the motion of the color difference components of the pixel G51. Note that, in more detail, the color difference quiescence determining unit 83 obtains the number of times of color difference quiescence of the Cr component, and the number of times of color difference quiescence of the Cb component individually as the number of times of color difference quiescence of the pixel G51. In this case, the absolute value difference C-ABS(N−1) is obtained for each of the color difference components (Cr component and Cb component).

Also, similar to the number of times of color difference quiescence of the pixel G51, the color difference quiescence determining unit 83 obtains the frequencies of color difference quiescence regarding all the pixels of which the number of times of color difference quiescence should be obtained with the image of the field (N−1), and supplies this to the color difference field interpolation unit 112.

Thus, the number of times of luminance quiescence is used to obtain the number of times of color difference quiescence for each field, whereby memory to hold the number of times of color difference quiescence can be reduced, and also the calculation cost of the number of times of color difference quiescence can be reduced. Also, the number of times of luminance quiescence obtained using luminance components that are more included in an image than color difference components, and are greater in deviation is employed, whereby the calculation precision of the number of times of color difference quiescence can be improved.

Note that description has been made so far wherein the number of times of luminance quiescence is used to obtain the number of times of color difference quiescence, but the number of times of color difference quiescence may be obtained by the same process as the number of times of luminance quiescence, or the like without using the number of times of luminance quiescence.

Now, description will return to the flowchart in FIG. 14, where upon the quiescence determination of the color difference components being executed in step S42, the process proceeds to step S43.

In step S43, the luminance field interpolation unit 111 uses the videos signals of the fields N and (N−2), and the number of times of luminance quiescence from the luminance quiescence determining unit 82 to execute the interpolation of the luminance components of the video signals of the field (N−1) from the frame buffer 21.

Figure 19:
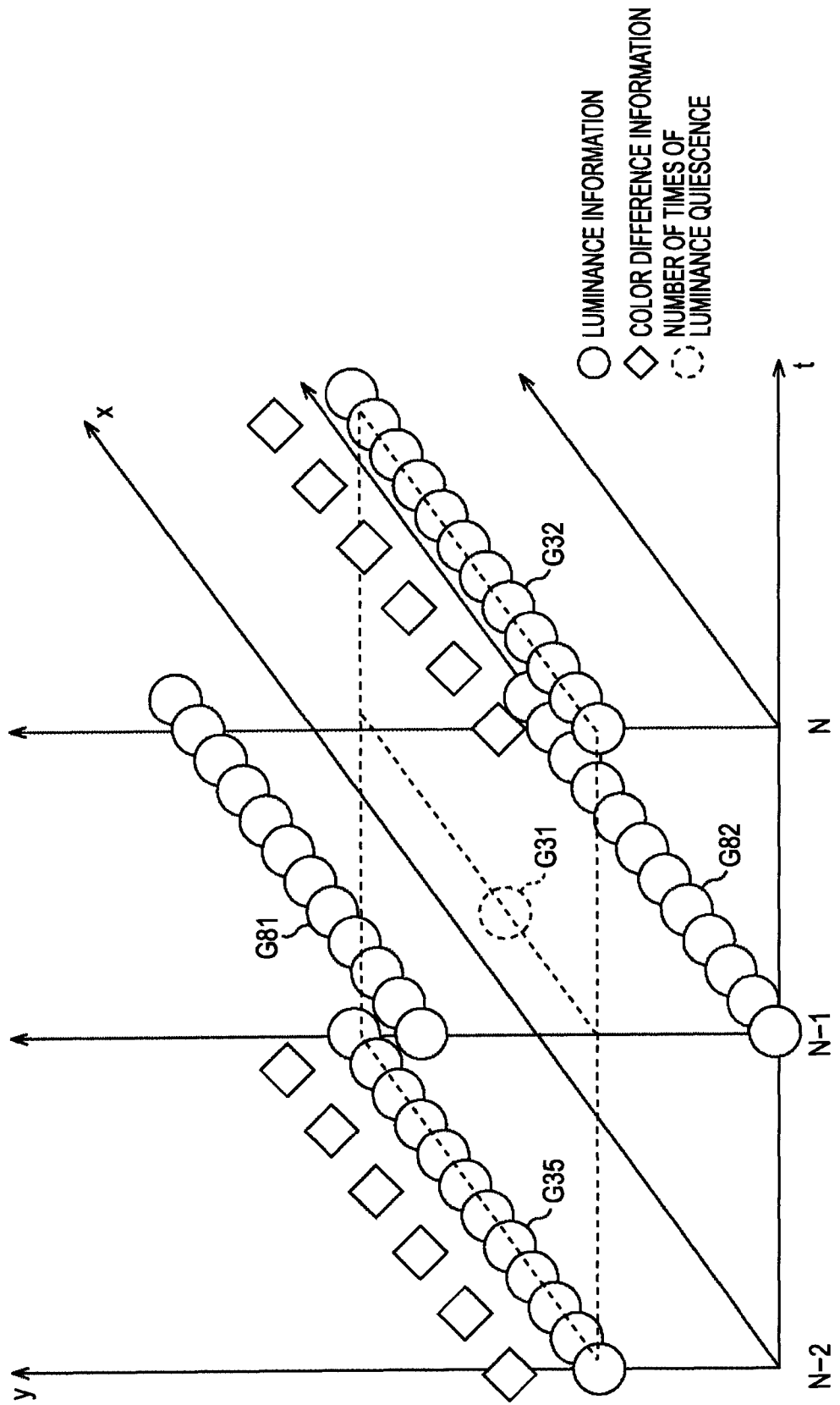
FIG. 19 is a diagram describing interpolation of a luminance component.

For example, as shown in FIG. 19, in the case that the luminance component of the pixel G31 on the image of the field (N−1) is interpolated, the luminance field interpolation unit 111 uses a pixel having a luminance component, disposed spatially and temporally near the pixel G31, to execute interpolation.

Note that, in FIG. 19, the same portions as those in FIG. 15 are denoted with the same reference symbols, and description thereof will be omitted as appropriate. Also, in FIG. 19, the horizontal direction represents time, and the vertical and depth directions represent the y and x directions respectively. Also, a single solid-line circle and a single solid-line square represent a pixel having a luminance component and a pixel having color difference components, with the image of each field, respectively.

Further, positions corresponding to point-in-time t=N, N−1, and N−2 represent the positions of the fields N through (N−2), and a circle or square at the position of the point-in-time t represents a pixel on the image of the field determined with the point-in-time t.

First, of pixels having a luminance component on the image of the field (N−1), the luminance field interpolation unit 111 obtains the average value LII(N−1) of the luminance components of pixels G81 and G82 adjacent to the pixel G31 in the y direction. Similarly, the luminance field interpolation unit 111 obtains the average value LIT(N−1) of the luminance components of the pixels G32 and G35 having the same phase as the pixel G31 with the images of fields temporally before and after the field (N−1).

Subsequently, the luminance field interpolation unit 111 mixes the average values LII(N−1) and LIT(N−1) with a ratio RL (N−1) determined from the number of times of luminance quiescence of the pixel G31, thereby calculating a luminance interpolation value that is the value of the interpolated luminance component of the pixel G31. That is to say, the sum of a value obtained by multiplying the average value LIT(N−1) by the RL(N−1), and a value obtained by multiplying the average value LII(N−1) by (1−RL(N−1)) is determined to be the luminance interpolation value of the pixel G31.

This ratio RL(N−1) indicates the mixture ratio of the average value LIT(N−1) as to the average value LII(N−1), and accordingly, with the luminance interpolation value, the higher the ratio RL(N−1), the more the components of the average value LIT(N−1) are included, and the lower the ratio RL(N−1), the more the components of the average value LII(N−1) are included.

Also, the ratio RL(N−1) is determined from the ratio table held at the luminance field interpolation unit 111 beforehand, and the number of times of luminance quiescence of the pixel G31.

Figure 20:
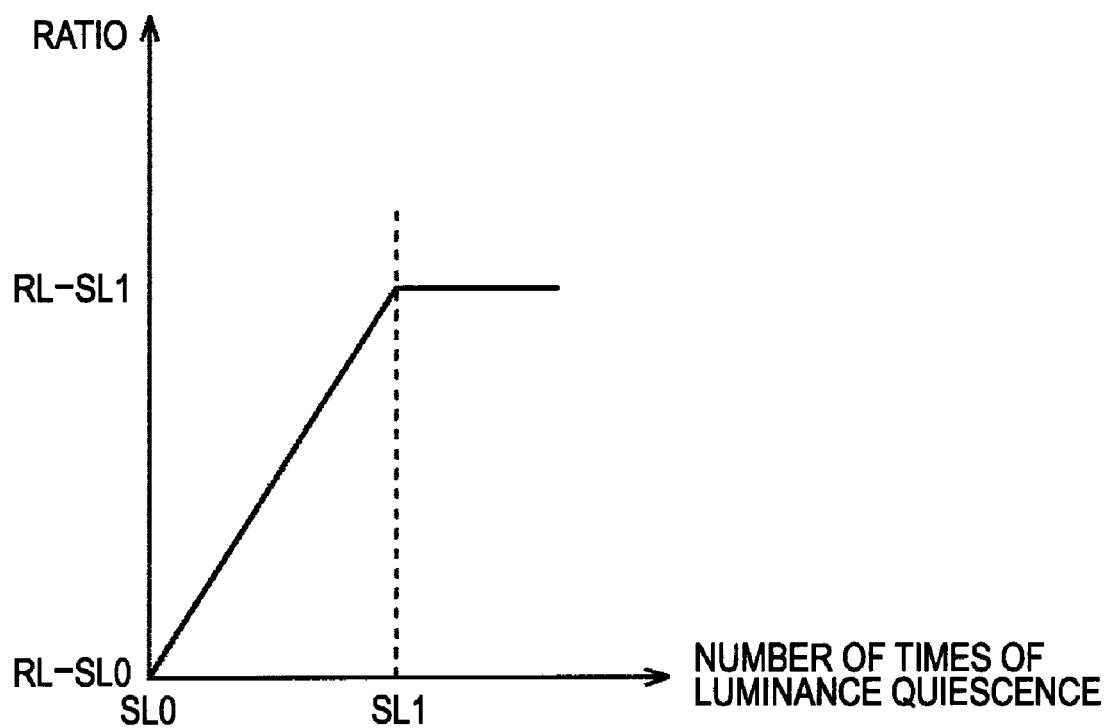
FIG. 20 is a diagram describing a ratio table.

For example, the ratio table held at the luminance field interpolation unit 111 is a table wherein the ratio RL(N−1) is changed as to the number of times of luminance quiescence such as shown in FIG. 20. Note that, in FIG. 20, the vertical axis represents the value of the ratio RL(N−1), and the horizontal axis represents the value of the number of times of luminance quiescence.

With the example in FIG. 20, in the case that the number of times of luminance quiescence is a default value SL0, RL-SL0 is determined to be the value of the ratio RL(N−1), and the value of the ratio RL(N−1) increases in proportion to the number of times of luminance quiescence until the number of times of luminance quiescence becomes SL1. That is to say, as the number of times of luminance quiescence increases, the value of the ratio RL(N−1) increases. Subsequently, upon the number of times of luminance quiescence reaching the SL1 or more, the value of the ratio RL(N−1) becomes fixed, and RL-SL1 is determined to be the value thereof.

In the case that the number of times of luminance quiescence of the pixel G31 decreases, the luminance component of the pixel G31 is moving, and accordingly, the luminance component of a pixel spatially near the pixel G31 is estimated to be closer to the luminance component of the pixel G31 than the luminance component of a pixel temporally near the pixel G31. Conversely, in the case that the number of times of luminance quiescence of the pixel G31 increases, the luminance component of the pixel G31 is in a quiescent state, and accordingly, the luminance component of a pixel temporally near the pixel G31 is estimated to be closer to the luminance component of the pixel G31 than the luminance component of a pixel spatially near the pixel G31.

Therefore, the ratio table is determined such that the less the number of times of luminance quiescence of the pixel G31 decreases, the smaller the ratio RL(N−1), the more the number of times of luminance quiescence increases.

The luminance field interpolation unit 111 references such a ratio table to determine a value determined by the number of times of luminance quiescence as the value of the ratio RL(N−1), thereby obtaining the luminance interpolation value of the pixel G31. Similarly, the luminance field interpolation unit 111 obtains the luminance interpolation values regarding all the pixels of which the luminance components should be obtained, with the image of the field (N−1).

Thus, the video signals of the field (N−1) of which the luminance components have been interpolated are obtained. The luminance field interpolation unit 111 supplies the obtained video signals to the color difference field interpolation unit 112.

Now, description will return to the flowchart in FIG. 14, where upon the interpolation of the luminance components being executed in step S43, the process proceeds to step S44.

In step S44, the color difference field interpolation unit 112 uses the video signals of the fields N and (N−2), and the number of times of color difference quiescence from the color difference quiescence determining unit 83 to execute the interpolation of the color difference components of the video signals of the field (N−1) from the luminance field interpolation unit 111.

Figure 21:
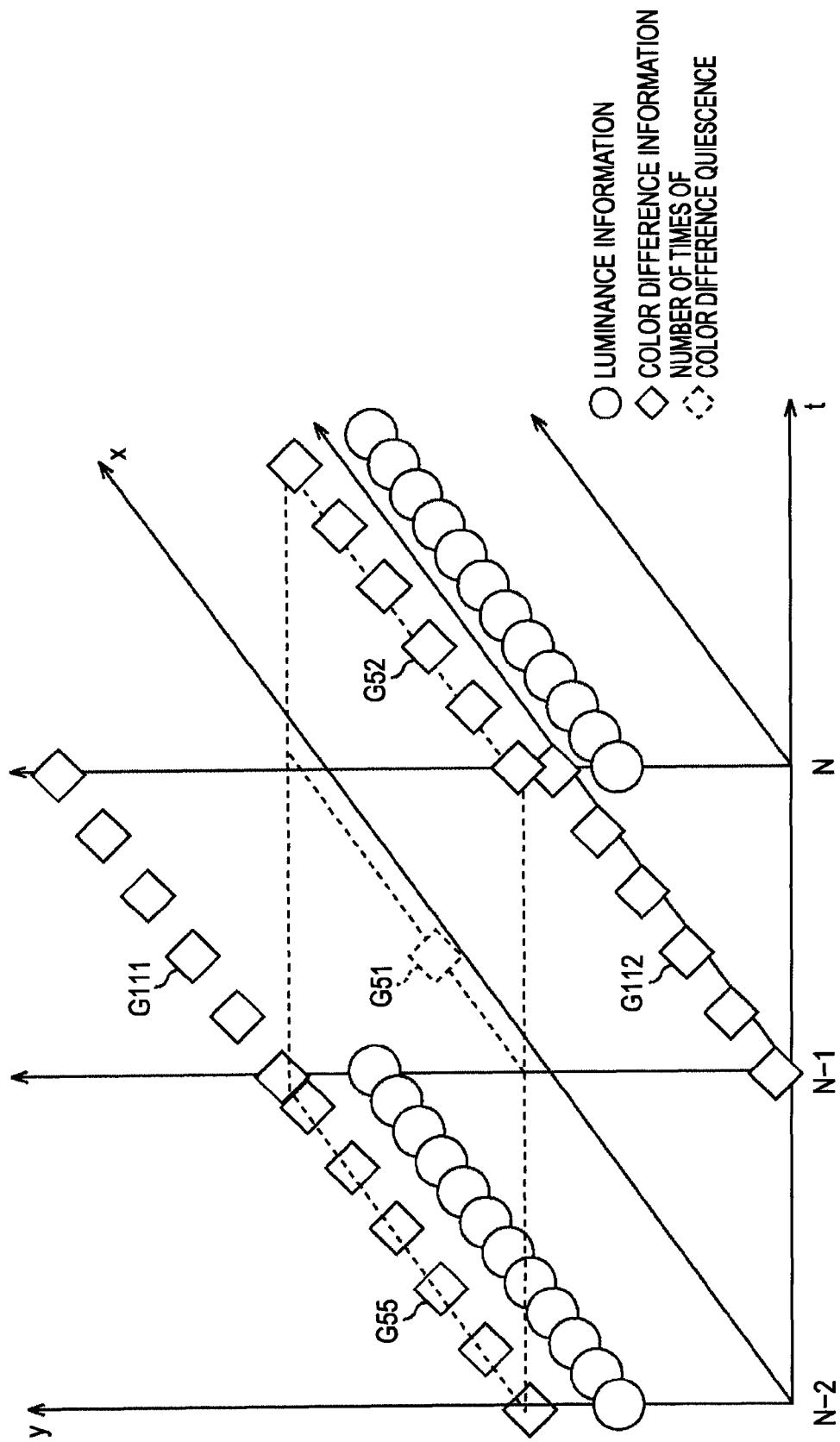
FIG. 21 is a diagram describing interpolation of color difference components.

For example, as shown in FIG. 21, in the case of interpolating the color difference components of the pixel G51 on the image of the field (N−1), the color difference field interpolation unit 112 uses a pixel having color difference components spatially or temporally near the pixel G51 to execute interpolation.

Note that, in FIG. 21, the same portions as those in FIG. 17 are denoted with the same reference symbols, and description thereof will be omitted as appropriate. Also, in FIG. 21, the horizontal direction represents time, and the vertical and depth directions represent the y and x directions respectively. Also, in FIG. 21, a single circle and a single square that are represented with a solid line represent a pixel having a luminance component and a pixel having color difference components, with the image of each field, respectively.

Further, positions corresponding to point-in-time t=N, N−1, and N−2 represent the positions of the fields N through (N−2), and a circle or square at the position of the point-in-time t represents a pixel on the image of the field determined with the point-in-time t.

First, of pixels having color difference components on the image of the field (N−1), the color difference field interpolation unit 112 obtains the average value CII(N−1) of the color difference components of pixels G111 and G112 adjacent to the pixel G51 in the y direction. Similarly, the color difference field interpolation unit 112 obtains the average value CIT(N−1) of the color difference components of the pixels G52 and G55 having the same phase as the pixel G51 with the images of fields temporally before and after the field (N−1).

Subsequently, the color difference field interpolation unit 112 mixes the average values CII(N−1) and CIT(N−1) with a ratio RC (N−1) determined from the number of times of color difference quiescence of the pixel G51, thereby calculating a color difference interpolation value that is the value of the interpolated color difference components of the pixel G51. That is to say, the sum of a value obtained by multiplying the average value CIT(N−1) by the RC(N−1), and a value obtained by multiplying the average value CII(N−1) by (1−RC(N−1)) is determined to be the color difference interpolation value of the pixel G51.

This ratio RC(N−1) indicates the mixture ratio of the average value CIT(N−1) as to the average value CII(N−1), and accordingly, with the color difference interpolation value, the higher the ratio RC(N−1), the more the components of the average value CIT(N−1) are included, and the lower the ratio RC(N−1), the more the components of the average value CII(N−1) are included.

Also, the ratio RC(N−1) is determined from the ratio table held at the color difference field interpolation unit 112 beforehand, and the number of times of color difference quiescence of the pixel G51.

Figure 22:
FIG. 22 is a diagram describing a ratio table.

For example, the ratio table held at the color difference field interpolation unit 112 is a table wherein the ratio RC(N−1) is changed as to the number of times of color difference quiescence such as shown in FIG. 22. Note that, in FIG. 22, the vertical axis represents the value of the ratio RC(N−1), and the horizontal axis represents the value of the number of times of color difference quiescence.

With the example in FIG. 22, in the case that the number of times of color difference quiescence is a default value SC0 (e.g., 0), RC-SC0 is determined to be the value of the ratio RC(N−1) for example, and the value of the ratio RC(N−1) increases in proportion to the number of times of color difference quiescence until the number of times of color difference quiescence becomes SC1. That is to say, as the number of times of color difference quiescence increases, the value of the ratio RC(N−1) increases. Subsequently, upon the number of times of color difference quiescence reaching the SC1 or more, the value of the ratio RC(N−1) becomes fixed, and RC-SC1 is determined to be the value thereof.

In the case that the number of times of color difference quiescence of the pixel G51 decreases, the color difference components of the pixel G51 are moving, and accordingly, the color difference components of a pixel spatially near the pixel G51 is estimated to be closer to the color difference components of the pixel G51 than the color difference components of a pixel temporally near the pixel G51. Conversely, in the case that the number of times of color difference quiescence of the pixel G51 increases, the color difference components of the pixel G51 are in a quiescent state, and accordingly, the color difference components of a pixel temporally near the pixel G51 are estimated to be closer to the color difference components of the pixel G51 than the color difference components of a pixel spatially near the pixel G51.

Therefore, the ratio table is determined such that the less the number of times of color difference quiescence of the pixel G51 decreases, the smaller the ratio RC(N−1), the more the number of times of color difference quiescence increases.

The color difference field interpolation unit 112 references such a ratio table to determine a value determined by the number of times of color difference quiescence as the value of the ratio RC(N−1), thereby obtaining the color difference interpolation value of the pixel G51. Note that, in more detail, the color difference field interpolation unit 112 obtains a Cr component and a Cb component individually as the color difference components of the pixel G51. In this case, the average value CII(N−1), average value CIT(N−1), and ratio RC(N−1) are obtained for each of the color difference components (Cr component and Cb component).

Also, in the same way, the color difference field interpolation unit 112 obtains the color difference interpolation values regarding all the pixels of which the color difference components should be obtained of the image of the field (N−1).

Upon the color difference components being thus interpolated, the video signals of the field (N−1) of which the video format has been converted into the progressive format are obtained. The color difference field interpolation unit 112 supplies the obtained video signals to the video selecting unit 25.

Figure 13:
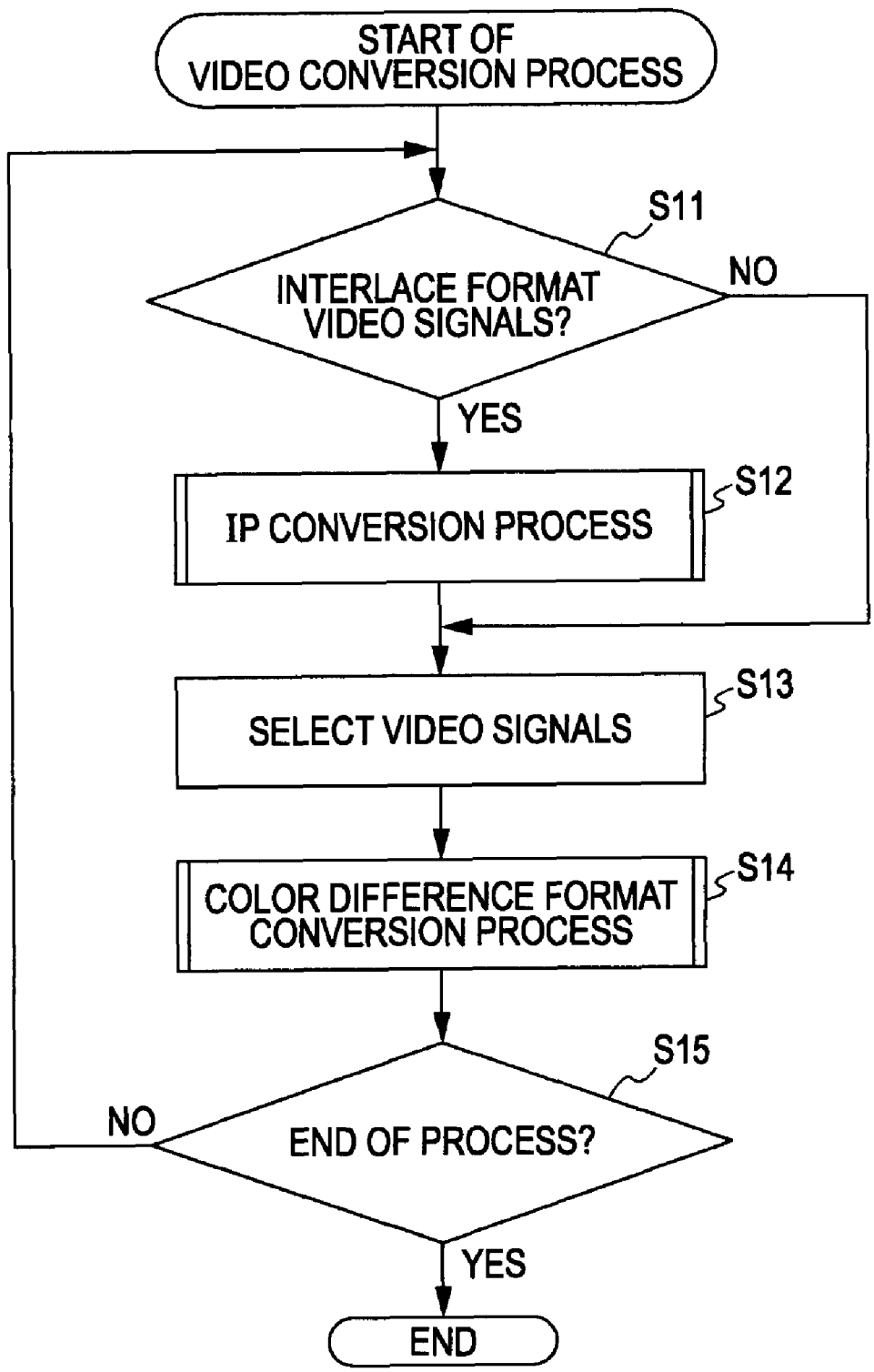
FIG. 13 is a flowchart describing a video conversion process.

Upon the video signals in the progressive format being supplied to the video selecting unit 25, the IP conversion process in FIG. 14 is ended, and the process proceeds to step S13 in FIG. 13.

Thus, the IP conversion unit 24 obtains the frequencies of quiescence regarding the luminance component and color difference components of the image of the field to be processed. Subsequently, the IP conversion unit 24 interpolates the luminance component and color difference components of a pixel positioned temporally or spatially near the pixel of interest according to the obtained frequencies of quiescence, and converts the video format of the video signals from the interlace format to the progressive format.

Thus, with the IP conversion process, according to the number of times of color difference quiescence of pixels of the image of the field to be processed, a pixel spatially or temporally near the pixel to be processed is used to execute the interpolation process, whereby the color difference components of the pixel to be processed can be estimated precisely. Thus, occurrence of color flickering, jaggies, chroma upsampling error, or the like, can be suppressed, and the image quality of the image can be improved.

That is to say, as described above, if the IP conversion process is executed before conversion of the color difference format, deterioration in image quality can be suppressed, but with the IP conversion process, the interpolation process using a spatially or temporally nearby pixel is executed according to the number of times of quiescence of each component, whereby deterioration in image quality can be further suppressed.

Also, correlation between a luminance component and color difference components, and the number of times of luminance quiescence of a pixel near the pixel to be processed are used to obtain the number of times of color difference quiescence of the pixel to be processed, whereby the storage capacity of memory for obtaining the number of times of color difference quiescence can be reduced.

Further, correlation between a luminance component and color difference components, and the number of times of luminance quiescence are used to obtain the number of times of color difference quiescence, whereby the number of times of color difference quiescence can be obtained with accurate and simple calculation. That is to say, change in a luminance component is greater than change in color difference components, and determination can be made accurately whether or not the luminance component of a pixel is in a quiescent state, and accordingly, the number of times of luminance quiescence is used to obtain the number of times of color difference quiescence, whereby the calculation precision of the number of times of color difference quiescence can be improved.

Next, the color difference format conversion process corresponding to the process in step S14 in FIG. 13 will be described with reference to the flowchart in FIG. 23.

In step S71, the similarity determining unit 141 executes the similarity determining process using the video signals from the color difference field interpolation unit 112 to obtain the similar direction for each pixel of the image based on the video signals, and supplies the obtained similar direction to the color difference phase interpolation unit 142.

Figure 24:
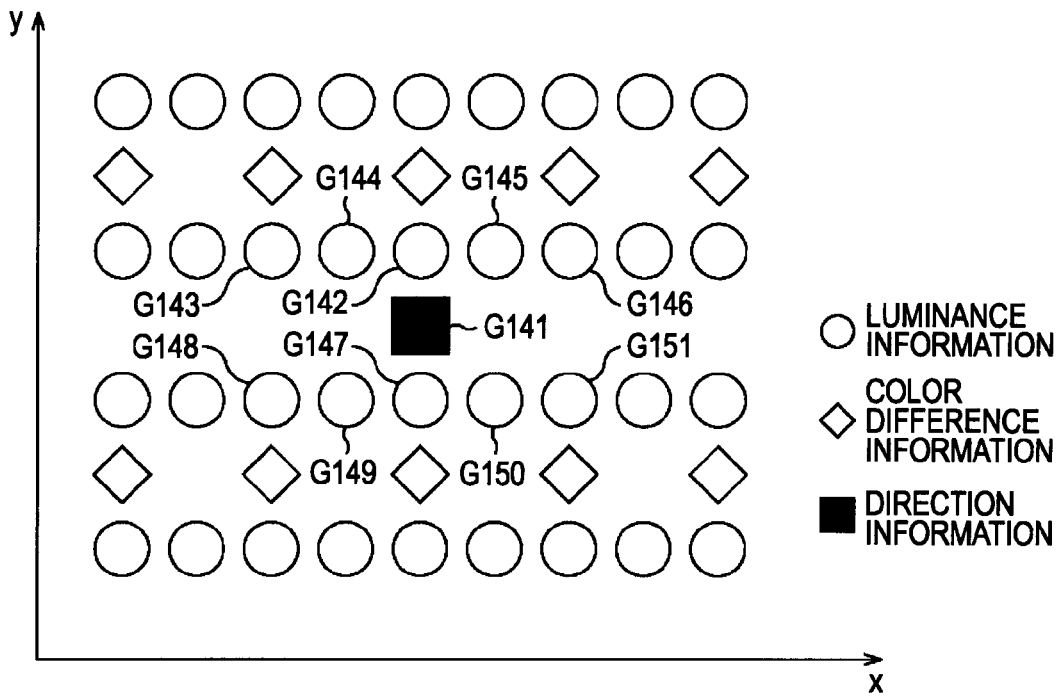
FIG. 24 is a diagram describing a similar direction.

For example, as shown in FIG. 24, let us consider obtaining the similar direction of a pixel G141 on the image based on the supplied video signals of the field (N−1). Note that, in FIG. 24, the horizontal and vertical directions represent the y and x directions, and a single circle and a single square (however, the pixel G141 is not included) represent a pixel having a luminance component and a pixel having color difference components, with the image, respectively.

With calculation of the similar direction of the pixel G141, several pixels including a pixel G142 adjacent to the pixel G141 in the y direction, consecutively arrayed in the x direction with the pixel G142 as the center, are used. For example, with the example in FIG. 24, the pixels G142 through G146 are used. Also, with calculation of the similar direction, several pixels including a pixel G147 adjacent to the pixel G141 in the y direction, consecutively arrayed in the x direction with the pixel G147 as the center, are used. For example, with the example in FIG. 24, the pixels G147 through G151 are used.

That is to say, the similarity determining unit 141 uses the pixels G142 through G151 positioned spatially near the pixel G141 to obtain the similar direction of the pixel G141.

Specifically, the similarity determining unit 141 obtains the absolute value difference AL(5−1) of the luminance components of the pixels G146 and G148, the absolute value difference AL(4−2) of the luminance components of the pixels G145 and G149, and the absolute value difference AL(3−3) of the luminance components of the pixels G142 and G147. Also, the similarity determining unit 141 obtains the absolute value difference AL(2−4) of the luminance components of the pixels G144 and G150, and the absolute value difference AL(1−5) of the luminance components of the pixels G143 and G151.

That is to say, of the pixels G142 through G151 having a luminance component, positioned in the vicinity of the pixel G141, such that two pixels of these pixels, and the pixel G141 are arrayed on a straight line, the two pixels are selected, and the absolute value difference of the luminance components of the selected two pixels is obtained.

Upon the absolute value difference of each set of pixels being obtained, the similarity determining unit 141 selects the smallest absolute value difference from the absolute value difference AL(5−1) through AL(1−5), and determines the direction of the straight line that connects the two pixels used for obtaining the selected absolute value difference as the similar direction.

For example, in the case that the absolute value difference AL(5−1) is the smallest absolute value difference, the information that indicates the pixels G146 and G148 is determined to be information that indicates the similar direction. In this case, the similar direction is a direction parallel to the line that connects the pixels G146 and G148.

This similar direction is a direction with the least change in the luminance components near the pixel G141, i.e., a direction where mutually similar pixels are arrayed. In other words, this similar direction is a direction where pixels most similar to the pixel G141 are arrayed in the vicinity of the pixel G141. The reason why a luminance component is used for obtaining the similar direction is because, as the features of luminance, luminance and color difference have sort of correlation, change in luminance is greater than change in color difference, and accordingly, a similar degree between pixels can be detected more precisely.

Figure 23:
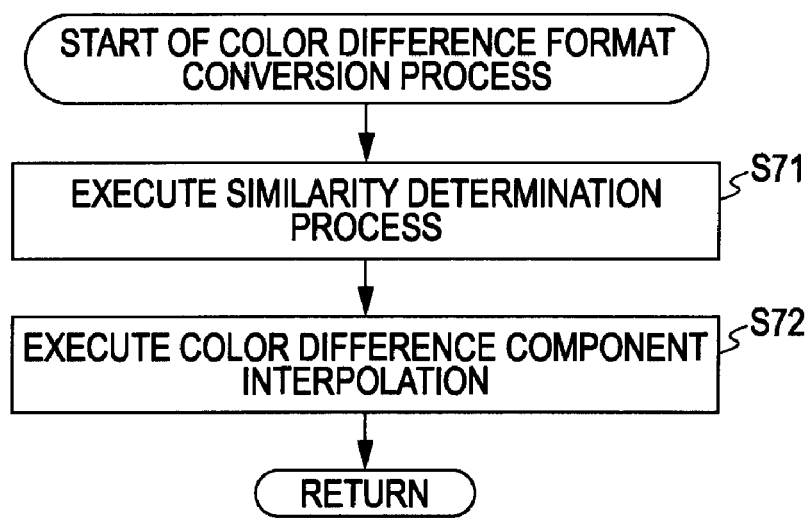
FIG. 23 is a flowchart describing a color difference format conversion process.

Now, description will return to the flowchart in FIG. 23, where upon the similar direction being obtained, the process proceeds from step S71 to step S72.

In step S72, the color difference phase interpolation unit 142 uses the similar direction from the similarity determining unit 141 to execute the interpolation of the color difference components of the image based on the video signals supplied from the color difference field interpolation unit 112.

Figure 25:
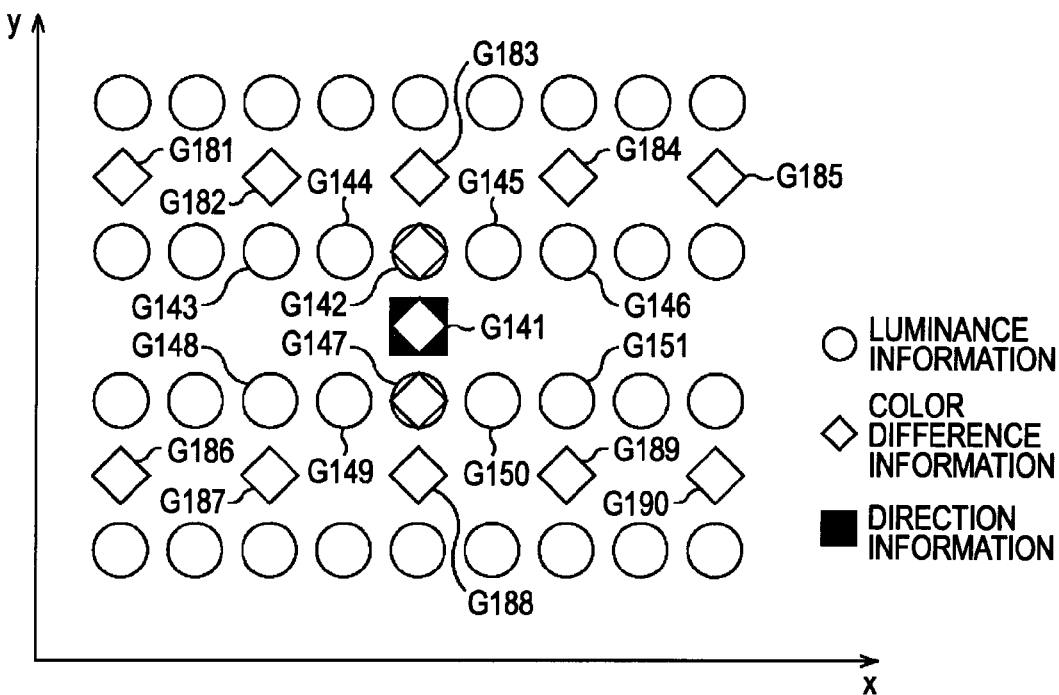
FIG. 25 is a diagram describing interpolation of color difference components.

For example, as shown in FIG. 25, let us consider obtaining the color difference components of the pixels G142 and G147 on the image based on the supplied video signals of the field (N−1) by interpolation. Note that, in FIG. 25, the portions corresponding those in FIG. 24 are denoted with the same reference symbols, and description thereof will be omitted as appropriate.

First, the color difference phase interpolation unit 142 obtains, of the pixels positioned in the vicinity of the pixel G141, the average value of the color difference components of the two pixels determined with the supplied similar direction, and determines the average value thereof as a color difference value C0 that is the value of the color difference components of the pixel G141.

The two pixels used for calculation of the color difference value C0 are positioned on straight lines that connect two pixels indicated with the similar direction, and the pixel G141, have color difference components, and are pixels positioned closest to the pixels indicated with the similar direction, respectively. In other words, the color difference value C0 of the pixel G141 includes the pixel G141, and is the average value of the color difference components of two pixels positioned in the vicinity of the pixel G141 on a pixel row where mutually similar pixels are arrayed.

Specifically, the pixel in the vicinity of the pixel G141 used for calculation of the color difference value C0 is selected from pixels G181 through G190. The pixels G181 through G185 are pixels arrayed consecutively in the x direction, and the pixel G183 positioned at the center of these pixels is adjacent to the pixel G142 in the y direction. Also, the pixels G186 through G190 are pixels arrayed consecutively in the x direction, and the pixel G188 positioned at the center of these pixels is adjacent to the pixel G147 in the y direction.

For example, in the case that the similar direction, in more detail, information that indicates the similar direction indicates the pixels G146 and G148, the color difference phase interpolation unit 142 determines the average value of the color difference components of the pixels G185 and G186 as the color difference value C0 of the pixel G141. Here, the pixels G141, G146, G148, G185, and G186 are arrayed on a straight line.

Also, in the case that the similar direction indicates the pixels G145 and G149, the average value of the color difference components of the pixels G184 and G187 is determined to be the color difference value C0. Also, in the case that the similar direction indicates the pixels G142 and G147, the average value of the color difference components of the pixels G183 and G188 is determined to be the color difference value C0.

Similarly, in the case that the similar direction indicates the pixels G144 and G150, the average value of the color difference components of the pixels G182 and G189 is determined to be the color difference value C0. Also, in the case that the similar direction indicates the pixels G143 and G151, the average value of the color difference components of the pixels G181 and G190 is determined to be the color difference value C0.

Upon the color difference value C0 of the pixel G141 being thus obtained, the color difference phase interpolation unit 142 uses this color difference value C0 to obtain a color difference interpolation value that is the interpolation value of the color difference components of the pixel G142.

That is to say, the color difference phase interpolation unit 142 obtains the average value CD(1) between the obtained color difference value C0 of the pixel G141, and the color difference components of the pixel G183.

Also, the color difference phase interpolation unit 142 obtains a color difference value CL(1) that is the value of the color difference components at the phase equivalent to the pixel G142 from the color difference components of the pixels G183 and G188. For example, the distance between the pixels G183 and G142 is one pixel, and the distance between the pixels G188 and G142 is three pixels, and accordingly, the color difference components of the pixels G183 and G188 are added with a ratio according to such distances. Specifically, a value obtained by multiplying the color difference components of the pixel G183 by (3/4), and a value obtained by multiplying the color difference components of the pixel G188 by (1/4) are added, and the addition result thereof is determined to be the color difference value CL(1).

Further, the color difference phase interpolation unit 142 obtains the absolute value difference CA(1) between the color difference value C0 of the pixel G141 and the color difference components of the pixel G183, and uses the obtained absolute value difference CA(1), and the ratio table held beforehand to obtain a ratio RDL. This ratio RDL indicates the mixture ratio of the color difference value CL(1) as to the average value CD(1), and the sum of a value obtained by multiplying the average value CD(1) by (1-RDL), and a value obtained by multiplying the color difference value CL(1) by the RDL is determined to be a color difference interpolation value that is the interpolation value of the color difference components of the pixel G142.

Figure 26:
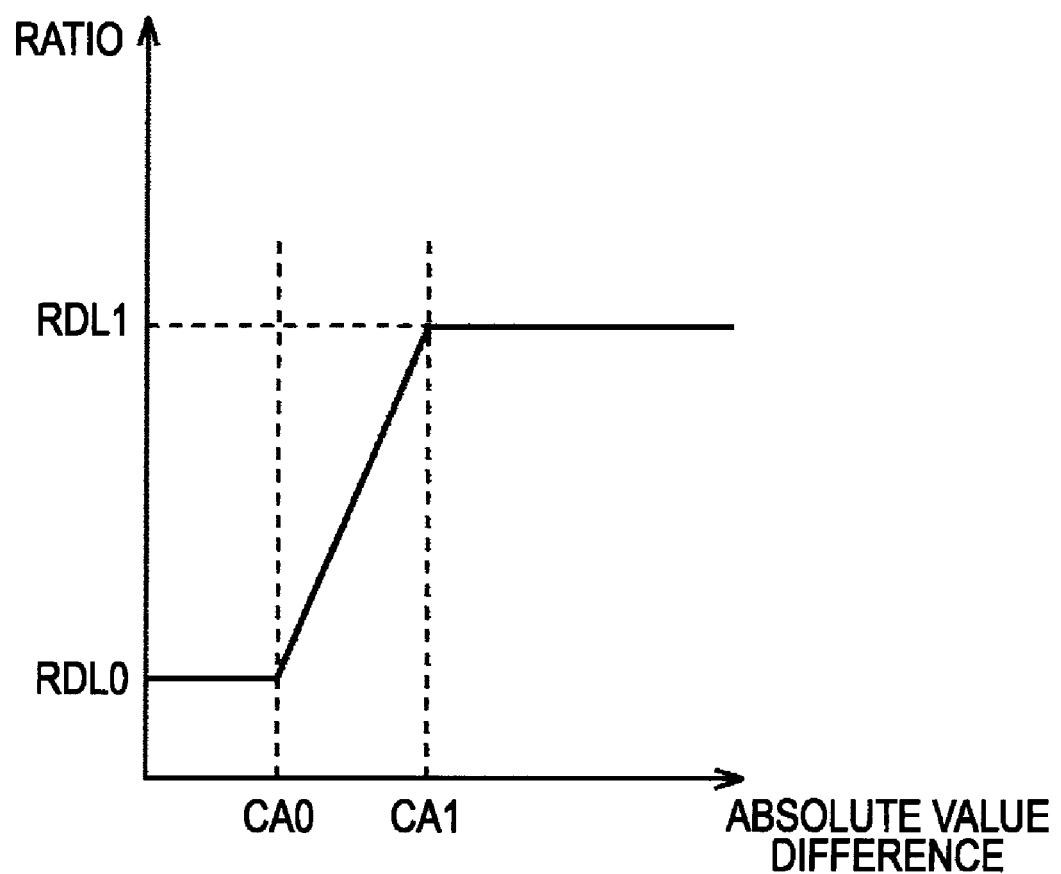
FIG. 26 is a diagram describing a ratio table.

For example, the ratio table held at the color difference phase interpolation unit 142 is a table wherein the ratio RDL changes as to the absolute value difference CA(1) such as shown in FIG. 26. Note that, in FIG. 26, the vertical axis represents the value of the ratio RDL, and the horizontal axis represents the value of the absolute value difference.

With the example in FIG. 26, in the case that the absolute value difference is below CA0, the value of the ratio RDL is determined to be RDL0, and the value of the ratio RDL increases in proportion to the absolute value difference while the absolute value difference is CA0 through CA1. That is to say, as the absolute value difference increases, the value of the ratio RDL increases. Subsequently, upon the absolute value difference exceeding CA1, the value of the ratio RDL is fixed, and RDL1 is determined to be the value thereof.

Upon obtaining the ratio RDL from the held ratio table and the absolute value difference CA(1), the color difference phase interpolation unit 142 obtains the color difference interpolation value of the pixel G142 from the obtained ratio RDL, average value CD(1), and color difference value CL(1).

According to the ratio table shown in FIG. 26, the smaller the absolute value difference CA(1), i.e., the smaller the gradient of the color difference components in the y direction in the vicinity of the pixel G141, the lower the ratio RDL, and accordingly, the color difference interpolation value of the pixel G142 includes many more components of the average value CD(1). This is because in the case that the gradient of the color difference components in the y direction is small, change in the color difference components is small, and accordingly, the value of the color difference components of the pixel G142 is estimated to be a value approximate to the pixels G183 and G141 adjacent to the y direction.

Conversely, with the ratio table, the greater the absolute value difference CA(1), i.e., the greater the gradient of the color difference components in the y direction in the vicinity of the pixel G141, the higher the ratio RDL, and accordingly, the color difference interpolation value of the pixel G142 includes many more components of the color difference value CL(1). This is because in the case that the gradient of the color difference components in the y direction is great, change in the color difference components is also great, and accordingly, the color difference interpolation value of the pixel G142 can be estimated more precisely in the case of using the pixel G183 adjacent to the pixel G142, and the pixel G188 positioned away from the pixel G142 to some extent, as compared to the case of using only pixels adjacent to the pixels 142.

Upon the color difference interpolation value of the pixel G142 being thus obtained, the color difference phase interpolation unit 142 executes the same process as in the case of the pixel G142 to obtain a color difference interpolation value that is the interpolation value of the color difference components of the pixel G147.

That is to say, the color difference phase interpolation unit 142 obtains the average value CD(2) between the obtained color difference value C0 of the pixel G141, and the color difference components of the pixel G188.

Also, the color difference phase interpolation unit 142 obtains a color difference value CL(2) that is the value of the color difference components of the phase equivalent to the pixel G147 from the color difference components of the pixels G183 and G188. For example, in the same way as in the case of the color difference value CL(1), the coefficients corresponding to the distance from the pixel G183 to the pixel G147, and the distance from the pixel G188 to the pixel G147 are multiplied as to the color difference components of the pixels G183 and G188, respectively. Subsequently, the sum of the color difference components of the pixels G183 and G188 multiplied by the coefficients is determined to be a color difference value CL(2).

Further, the color difference phase interpolation unit 142 obtains an absolute value difference CA(2) between the color difference value C0 of the pixel G141, and the color difference components of the pixel G188, and uses the obtained absolute value difference CA(2), and the ratio table in FIG. 26 held beforehand to obtain the ratio RDL.

Subsequently, the color difference phase interpolation unit 142 obtains the color difference interpolation value of the pixel G147 from the obtained ratio RDL, average value CD(2), and color difference value CL(2). That is to say, the sum of a value obtained by multiplying the average value CD(2) by (1-RDL), and a value obtained by multiplying the color difference value CL(2) by the RDL is determined to be the color difference interpolation value of the pixel G147.

The color difference interpolation values of the pixels G142 and G147 thus obtained are equivalent to, for example, the value of the color difference components of each pixel on the left edge of the Line 0 and Line 2 in FIG. 4. Note that, in more detail, the color difference phase interpolation unit 142 obtains a Cr component and a Cb component individually as the color difference interpolation values of the pixels G142 and G147.

Similarly, the color difference phase interpolation unit 142 obtains color difference interpolation values regarding all the pixels of which the color difference components should be obtained, with the image of the field (N−1).

Upon the color difference components being thus obtained, the video signals of the field (N−1) of which the color difference format is 4:2:2 and the video format is the progressive format are obtained. Upon the color difference phase interpolation unit 142 outputting the obtained video signals, the color difference format conversion process is ended, and the process proceeds to step S15 in FIG. 13.

Thus, the color difference format conversion unit 26 executes similarity determination with the video signals in the progressive format as a processing target, and interpolates the color difference components using the similarity determination result, thereby converting the color difference format of the video signals from 4:2:0 to 4:2:2.

Executing interpolation of color difference components using the similarity determination results is equivalent to selecting a filter to be used for interpolation according to the features of the color difference that a pixel has. Thus, a filter is set to be variable, and the interpolation process according to the features of color difference is executed, whereby the color difference components can be estimated more accurately, and as a result thereof, jaggies or deterioration in perceived resolution that has occurred at the time of converting the color difference format of video signals with the related art can be suppressed. Therefore, the image quality of the image based on the video signals can be improved. Also, the video signals having little deterioration thus obtained are subjected to a high-quality process at the subsequent stage, whereby the image quality of the image based on the video signals can be further improved.

Further, the features of color difference used for selecting a filter, i.e., the similar direction of a pixel is obtained using the luminance component of which the change is greater than the color difference components, the detection precision of the features of a pixel is high, whereby the features of the color difference of each pixel can be estimated more accurately. Thus, the interpolation precision of the color difference components of each pixel can be improved to suppress occurrence of a false color or noise, and image quality can be improved.

The above-mentioned series of processes can be executed by hardware, and can also be executed by software. In the case of executing the series of processing by software, a program making up the software thereof is installed from a program recording medium to a computer built into dedicated hardware, or a general-purpose personal computer capable of executing various types of functions by various types of programs being installed, or the like.

FIG. 27 is a block diagram illustrating a hardware configuration example of a computer which executes the above-mentioned series of processes by the program. With the computer, a CPU (Central Processing Unit) 201, ROM (Read Only Memory) 202, and RAM (Random Access Memory) 203 are connected mutually by a bus 204. An input/output interface 205 is further connected to the bus 204. An input unit 206 made up of a keyboard, mouse, microphone, or the like, an output unit 207 made up of a display, speaker, or the like, a recording unit 208 made up of a hard disk, nonvolatile memory, or the like, a communication unit 209 made up of a network interface or the like, and a drive 210 which drives a removable medium 211 such as a magnetic disk, optical disc, magneto-optical disk, semiconductor memory, or the like are connected to the input/output interface 205.

With the computer thus configured, for example, the CPU 201 loads the program recorded in the recording unit 208 to the RAM 203 via the input/output interface 205 and the bus 204, and executes this, thereby executing the above-mentioned series of processes.

The program that the computer (CPU 201) executes is provided by being recorded in the removable medium 211 that is a package medium made up of a magnetic disk (including flexible disk), optical disc (CD-ROM (Compact Disc-Read Only Memory), DVD (Digital Versatile Disc), etc.), magneto-optical disk, semiconductor memory, or the like, or via a cable or wireless transmission medium such as a local area network, the Internet, a digital satellite broadcasting, or the like.

The program can be installed into the recording unit 208 via the input/output interface 205 by mounting the removable medium 211 on the drive 210. Also, the program can be installed into the recording unit 208 by being received at the communication unit 209 via a cable or wireless transmission medium. Alternatively, the program may be installed into the ROM 202 or recording unit 208 beforehand.

Note that the program that the computer executes may be a program to execute a process in time series along the sequence described in the present Specification, or may be a program to execute a process in parallel or at an appropriate timing, such being called up, or the like.

Note that the embodiments of the present invention are not restricted to the above-mentioned embodiment, and various modifications can be performed without departing from the essence of the present invention.

The present application contains subject matter related to that disclosed in Japanese Priority Patent Application JP 2008-263513 filed in the Japan Patent Office on Oct. 10, 2008, the entire content of which is hereby incorporated by reference.

It should be understood by those skilled in the art that various modifications, combinations, sub-combinations and alterations may occur depending on design requirements and other factors insofar as they are within the scope of the appended claims or the equivalents thereof.

What is claimed is:

1. A video conversion apparatus comprising:
   video format conversion means configured to interpolate, in the case that video signals, which are made up of a luminance component and color difference components and of which the video format is the interlace format, have been supplied, the luminance component and color difference components of said video signals, thereby converting the video format of said video signals into the progressive format; and
   color difference format conversion means configured to interpolate the color difference components of said video signals obtained with the conversion by said video format conversion means using information obtained from both luminance and color difference components, thereby converting the color difference format of said video signals from a first color difference format to a second color difference format that includes more color difference components than said first color difference format.

2. A video conversion apparatus comprising:

a video format conversion unit configured to interpolate, in the case that video signals, which are made up of luminance components and color difference components and of which the video format is the interlace format, have been supplied, the luminance component and color difference components of said video signals, thereby converting the video format of said video signals into the progressive format; and a color difference format conversion unit configured to interpolate the color difference components of said video signals obtained with the conversion by said video format conversion unit using information obtained from both luminance and color difference components, thereby converting the color difference format of said video signals from a first color difference format to a second color difference format that includes more color difference components than said first color difference format.

3. The video conversion apparatus according to claim 2, said color difference format conversion unit comprising:

a similar direction determining unit configured to use the luminance components of a pixel of the image based on said video signals to obtain a similar direction where similar pixels are arrayed mutually near a predetermined pixel; and a color difference phase interpolation unit configured to use a pixel specified with said similar direction to interpolate the color difference components of a pixel near said predetermined pixel.

4. The video conversion apparatus according to claim 2, said video format conversion unit comprising:

a luminance quiescence detecting unit configured to use said video signals made up of consecutive several fields to detect whether or not there is change in the luminance component of a pixel on the image based on said video signals;

a luminance interpolation unit configured to use a pixel positioned temporally or spatially near a first pixel of interest within said image of a field to be processed to interpolate the luminance component of said first pixel of interest based on the detection result of said luminance quiescence detecting unit;

a color difference quiescence detecting unit configured to use said video signals made up of consecutive several fields to detect whether or not there is change in the color difference component of a pixel on the image based on said video signals; and a color difference interpolation unit configured to use a pixel positioned temporally or spatially near a second pixel of interest within said image of said field to be processed to interpolate the color difference component of said second pixel of interest based on the detection result of said color difference quiescence detecting unit.

5. The video conversion apparatus according to claim 4, wherein said color difference quiescence detecting unit uses the detection result by said luminance quiescence detecting unit to detect whether or not there is change in color difference components.

6. A video conversion method for a video conversion apparatus which includes video format conversion means configured to interpolate, in the case that video signals, which are made up of a luminance component and color difference components and of which the video format is the interlace format, have been supplied, the luminance component and color difference components of said video signals, thereby converting the video format of said video signals into the progressive format, and color difference format conversion means configured to interpolate the color difference components of said video signals obtained with the conversion by said video format conversion means using information obtained from both luminance and color difference components, thereby converting the color difference format of said video signals from a first color difference format to a second color difference format that includes more color difference components than said first color difference format, said video conversion method comprising the steps of:

converting the video format of said video signals from the interlace format to the progressive format using said video format conversion means; and converting the color difference format of said video signals of which the video format has been converted from said first color difference format to said second color difference format using said color difference format conversion means.

7. A non-transitory, computer-readable storage medium storing a program that, when executed by a computer, causes the computer to perform a method, the method comprising:

interpolating, in the case that video signals, which are made up of a luminance component and color difference components and of which the video format is the interlace format, have been supplied, the luminance component and color difference components of said video signals, thereby converting the video format of said video signals into the progressive format, and interpolating the color difference components of said video signals obtained with the conversion of the video format using information obtained from both luminance and color difference components, thereby converting the color difference format of said video signals from a first color difference format to a second color difference format that includes more color difference components than said first color difference format.

8. A video conversion method for a video conversion apparatus which includes a video format conversion unit configured to interpolate, in the case that video signals, which are made up of a luminance component and color difference components and of which the video format is the interlace format, have been supplied, the luminance component and color difference components of said video signals, thereby converting the video format of said video signals into the progressive format, and a color difference format conversion unit configured to interpolate the color difference components of said video signals obtained with the conversion by said video format conversion unit using information obtained from both luminance and color difference components, thereby converting the color difference format of said video signals from a first color difference format to a second color difference format that includes more color difference components than said first color difference format, said video conversion method comprising the steps of:
converting the video format of said video signals from the interlace format to the progressive format using said video format conversion unit; and
converting the color difference format of said video signals of which the video format has been converted from said first color difference format to said second color difference format using said color difference format conversion unit.

* * * * *